United States Patent
Sakai

(10) Patent No.: US 10,459,878 B2
(45) Date of Patent: Oct. 29, 2019

(54) MEDIUM STORING DATA CONVERSION PROGRAM, DATA CONVERSION DEVICE, AND DATA CONVERSION METHOD

(71) Applicant: FUJITSU LIMITED, Kawasaki-shi, Kanagawa (JP)

(72) Inventor: Takafumi Sakai, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/614,767

(22) Filed: Jun. 6, 2017

(65) Prior Publication Data

US 2018/0060741 A1    Mar. 1, 2018

(30) Foreign Application Priority Data

Aug. 24, 2016 (JP) .................................. 2016-163882

(51) Int. Cl.
   *G06F 16/00*      (2019.01)
   *H04L 12/40*     (2006.01)
   (Continued)

(52) U.S. Cl.
   CPC ............ *G06F 16/00* (2019.01); *G06F 21/606* (2013.01); *G06F 21/6245* (2013.01);
   (Continued)

(58) Field of Classification Search
   CPC .................................. G11C 16/10; G11C 7/22
   (Continued)

(56) References Cited

U.S. PATENT DOCUMENTS 5,910,987 A *  6/1999  Ginter .................... G06F 21/10
                                                348/E5.006
6,154,541 A * 11/2000 Zhang ................... H04L 9/3073
                                                      380/28
(Continued)

FOREIGN PATENT DOCUMENTS

| JP | 2000-138916 A | 5/2000 |
| JP | 2008-124824 A | 5/2008 |
| JP | 2008-160520 A | 7/2008 |

OTHER PUBLICATIONS

Hayouni, H. et al, "A Survey on Encryption Schemes in Wireless Sensor Networks", 2014 7th International Conference on Advanced Software Engineering and Its Applications, IEEE, Dec. 20, 2014, pp. 39-43; cited in Extended European Search Report dated Dec. 1, 2017.

(Continued)

*Primary Examiner* — Michael T Tran
(74) *Attorney, Agent, or Firm* — Westerman, Hattori, Daniels & Adrian, LLP

(57) ABSTRACT

A data conversion method performed by a computer, the method is configured to cause the computer to; when the computer receives a plurality of data, acquire first information and second information from a storage, the first information designating any data among the plurality of data, the second information designating a predetermined number of data, data formats of which are collectively converted among the plurality of data; acquire, based on the acquired first information and the acquired second information, the predetermined number of conversion target data from the received plurality of data; extract each pieces of specific information embedded in each of the acquired predetermined number of conversion target data; and convert the data format of each of the respective predetermined number (Continued)

of conversion target data by using the extracted predetermined number of pieces of the specific information.

17 Claims, 23 Drawing Sheets

(51) Int. Cl.
| H04L 29/08 | (2006.01) |
| H04W 4/70 | (2018.01) |
| H04L 29/06 | (2006.01) |
| G06F 21/60 | (2013.01) |
| G06F 21/62 | (2013.01) |
| H04L 12/879 | (2013.01) |

(52) U.S. Cl.
CPC .......... *H04L 12/40* (2013.01); *H04L 63/0428* (2013.01); *H04L 67/2823* (2013.01); *H04W 4/70* (2018.02); *H04L 49/901* (2013.01)

(58) Field of Classification Search
USPC ........................................ 365/189.05, 185.02
See application file for complete search history.

(56) References Cited

U.S. PATENT DOCUMENTS

| 7,003,666 | B1* | 2/2006 | Inoue | G06T 1/005 713/176 |
| 7,028,326 | B1* | 4/2006 | Westlake | H04N 5/44543 725/39 |
| 7,069,447 | B1* | 6/2006 | Corder | G06F 21/79 713/168 |
| 7,111,167 | B1* | 9/2006 | Yeung | G06F 21/16 380/30 |
| 7,200,230 | B2* | 4/2007 | Knauft | G06F 21/10 380/201 |
| 7,565,455 | B2* | 7/2009 | He | H04L 12/4625 370/397 |
| 7,580,521 | B1* | 8/2009 | Spies | H04L 9/3073 380/281 |
| 8,121,057 | B1* | 2/2012 | Botha | H04L 12/1827 370/270 |
| 9,203,612 | B1* | 12/2015 | Day | H04L 9/0825 |
| 9,634,999 | B1* | 4/2017 | Marion | H04L 63/0838 |
| 9,977,915 | B2* | 5/2018 | Subramanian | G06F 21/6218 |
| 2002/0199106 | A1* | 12/2002 | Hayashi | G06T 1/005 713/176 |
| 2003/0009694 | A1* | 1/2003 | Wenocur | G06Q 10/107 726/4 |
| 2003/0041110 | A1* | 2/2003 | Wenocur | G06Q 10/107 709/206 |
| 2003/0076979 | A1* | 4/2003 | Matsui | G06T 1/0028 382/100 |
| 2003/0084179 | A1* | 5/2003 | Kime | H04L 29/06027 709/231 |
| 2003/0105950 | A1* | 6/2003 | Hirano | G06F 21/6218 713/100 |
| 2003/0177093 | A1* | 9/2003 | Hirano | G06F 21/10 705/50 |
| 2003/0179885 | A1* | 9/2003 | Gentry | H04L 9/0836 380/277 |
| 2005/0201556 | A1* | 9/2005 | Rijckaert | G11B 20/00086 380/37 |
| 2006/0072611 | A1* | 4/2006 | Kamperman | H04N 5/76 370/473 |
| 2006/0150251 | A1* | 7/2006 | Takashima | G11B 20/00086 726/26 |
| 2006/0222177 | A1* | 10/2006 | Iwamoto | H04N 7/1675 380/200 |
| 2006/0294312 | A1* | 12/2006 | Walmsley | H04L 9/0662 711/122 |
| 2007/0033399 | A1* | 2/2007 | Takeda | H04L 9/065 713/168 |
| 2007/0033421 | A1* | 2/2007 | Morita | H04L 63/0428 713/193 |
| 2007/0276765 | A1* | 11/2007 | Hazel | G06F 21/72 705/71 |
| 2007/0288715 | A1* | 12/2007 | Boswell | G11B 20/00086 711/164 |
| 2008/0049939 | A1* | 2/2008 | Canetti | H04L 9/0894 380/277 |
| 2008/0107274 | A1* | 5/2008 | Worthy | G06F 21/602 380/278 |
| 2008/0168135 | A1* | 7/2008 | Redlich | G06Q 10/10 709/204 |
| 2008/0273697 | A1* | 11/2008 | Greco | G11B 20/00086 380/44 |
| 2009/0060175 | A1* | 3/2009 | Schneider | H04L 9/085 380/28 |
| 2009/0103137 | A1* | 4/2009 | Ishii | G06T 1/0021 358/1.17 |
| 2009/0132830 | A1* | 5/2009 | Haga | H04L 9/085 713/189 |
| 2009/0202077 | A1* | 8/2009 | Hils | G06F 21/10 380/277 |
| 2009/0276591 | A1* | 11/2009 | Mu | G06F 11/1464 711/162 |
| 2009/0316884 | A1* | 12/2009 | Fujiwara | H04L 9/0637 380/28 |
| 2010/0010968 | A1* | 1/2010 | Redlich | G06Q 10/00 707/E17.014 |
| 2010/0082532 | A1* | 4/2010 | Shaik | G06F 17/30563 707/609 |
| 2010/0094803 | A1* | 4/2010 | Yamakawa | G06F 17/30997 707/609 |
| 2010/0268692 | A1* | 10/2010 | Resch | G06F 11/1044 707/687 |
| 2011/0013882 | A1* | 1/2011 | Kusunoki | G11B 27/034 386/241 |
| 2011/0040985 | A1* | 2/2011 | Tsuchiya | G06Q 10/10 713/190 |
| 2011/0072509 | A1* | 3/2011 | Mohanty | G06F 21/305 726/17 |
| 2011/0078286 | A1* | 3/2011 | Nishino | H04N 1/00127 709/219 |
| 2011/0081019 | A1* | 4/2011 | Takagi | G06T 1/0057 380/268 |
| 2011/0227720 | A1* | 9/2011 | Nakashiro | G06F 9/5027 340/531 |
| 2012/0018506 | A1* | 1/2012 | Hammad | G06F 21/34 235/375 |
| 2012/0158432 | A1* | 6/2012 | Jain | G06Q 50/24 705/3 |
| 2012/0163597 | A1* | 6/2012 | Pan | H04L 9/0891 380/255 |
| 2012/0166934 | A1* | 6/2012 | Kihara | G06F 3/1208 715/234 |
| 2012/0288091 | A1* | 11/2012 | Honke | H04N 5/913 380/210 |
| 2012/0328093 | A1* | 12/2012 | Kudo | B25J 9/0003 380/28 |
| 2013/0103942 | A1* | 4/2013 | Sullivan | H04L 9/0662 713/168 |
| 2013/0208811 | A1* | 8/2013 | Liu | H04N 21/23406 375/240.26 |
| 2013/0219473 | A1* | 8/2013 | Schaefer | G06F 21/335 726/4 |
| 2013/0232424 | A1* | 9/2013 | Nakagoe | G06F 3/0484 715/738 |
| 2013/0262489 | A1* | 10/2013 | Shirakawa | G06F 17/30424 707/756 |
| 2013/0268357 | A1* | 10/2013 | Heath | H04L 63/00 705/14.53 |
| 2013/0276009 | A1* | 10/2013 | Ajitomi | H04N 21/43 725/14 |
| 2013/0287210 | A1* | 10/2013 | Matsuda | H04L 9/0894 380/44 |
| 2013/0347094 | A1* | 12/2013 | Bettini | H04L 63/0245 726/11 |

(56) References Cited

U.S. PATENT DOCUMENTS

| | | | | |
|---|---|---|---|---|
| 2014/0289323 | A1* | 9/2014 | Kutaragi | G06Q 50/01 709/203 |
| 2014/0310536 | A1* | 10/2014 | Shacham | G06F 21/78 713/193 |
| 2014/0373042 | A1* | 12/2014 | Le Pelerin | H04N 21/4348 725/31 |
| 2015/0026011 | A1* | 1/2015 | Chow | G01S 19/14 705/26.61 |
| 2015/0026459 | A1* | 1/2015 | Divakar | H04L 63/0428 713/160 |
| 2015/0026462 | A1* | 1/2015 | Ramesh | G06F 21/6218 713/165 |
| 2015/0046376 | A1* | 2/2015 | Geller | G06N 5/02 706/12 |
| 2015/0081389 | A1* | 3/2015 | Dereszynski | G06Q 30/0204 705/7.33 |
| 2015/0100787 | A1* | 4/2015 | Westin | G06F 21/602 713/168 |
| 2015/0163053 | A1 | 6/2015 | Izu et al. | |
| 2015/0189496 | A1* | 7/2015 | Park | H04W 8/183 455/418 |
| 2015/0199537 | A1* | 7/2015 | Dykstra | G06F 21/6227 713/189 |
| 2015/0200773 | A1* | 7/2015 | Sella | H04L 9/0816 380/277 |
| 2015/0332653 | A1* | 11/2015 | Kakinuma | H04N 1/407 345/600 |
| 2015/0379510 | A1* | 12/2015 | Smith | G06Q 20/3829 705/71 |
| 2016/0037057 | A1* | 2/2016 | Westin | H04N 5/23222 348/207.1 |
| 2016/0055272 | A1* | 2/2016 | Chen | G06F 17/505 716/106 |
| 2016/0056957 | A1* | 2/2016 | Clarke | H04B 7/18593 380/285 |
| 2016/0057491 | A1* | 2/2016 | Ueda | G06F 21/10 713/193 |
| 2016/0105433 | A1* | 4/2016 | Ishida | H04W 12/06 726/7 |
| 2016/0156463 | A1* | 6/2016 | Suzuki | H04L 9/0861 713/171 |
| 2016/0189325 | A1* | 6/2016 | Zhou | G06T 1/005 380/28 |
| 2016/0203468 | A1* | 7/2016 | Chen | G06Q 20/3274 705/75 |
| 2016/0224802 | A1* | 8/2016 | Arnold | G06F 16/22 |
| 2016/0239528 | A1* | 8/2016 | Pemberton | G06F 16/21 |
| 2016/0269371 | A1* | 9/2016 | Coimbatore | H04L 63/0471 |
| 2016/0306965 | A1* | 10/2016 | Iyer | G06F 21/552 |
| 2016/0315762 | A1* | 10/2016 | Moon | H04L 9/065 |
| 2016/0337354 | A1* | 11/2016 | Smadja | H04W 4/70 |
| 2016/0357732 | A1* | 12/2016 | Hsu | G06F 17/289 |
| 2017/0019376 | A1* | 1/2017 | Hars | H04L 63/0428 |
| 2017/0034248 | A1* | 2/2017 | Bals | H04L 63/0428 |
| 2017/0039255 | A1* | 2/2017 | Raj | G06F 17/30371 |
| 2017/0061093 | A1* | 3/2017 | Amarasingham | G06F 19/325 |
| 2017/0068732 | A1* | 3/2017 | Newman | G06F 17/30864 |
| 2017/0123907 | A1* | 5/2017 | Dhuse | G06F 3/0659 |
| 2017/0244969 | A1* | 8/2017 | Wongpaisarnsin | H04N 19/149 |
| 2017/0317985 | A9* | 11/2017 | Westin | H04L 63/0428 |
| 2018/0069696 | A1* | 3/2018 | Yoo | G06F 21/6245 |
| 2019/0087431 | A1* | 3/2019 | Qiu | G06F 16/13 |
| 2019/0220852 | A1* | 7/2019 | Black | G06Q 20/3672 |

OTHER PUBLICATIONS

Extended European Search Report dated Dec. 1, 2017, issued in counterpart European Application No. 17174717.3. (9 pages).

* cited by examiner

FIG. 22

| DATA ID | SENSOR ID | TIME STAMP | CONTENT |
|---|---|---|---|
| 1 | 3c | 2016/07/25 14:00:00 | TEMPERATURE: 23.5(°C) |
| 2 | 3c | 2016/07/25 14:00:10 | HUMIDITY: 60(%) |
| 3 | 3c | 2016/07/25 14:01:00 | TEMPERATURE: 23.8(°C) |
| 4 | 3c | 2016/07/25 14:01:10 | HUMIDITY: 58(%) |
| 5 | 3c | 2016/07/25 14:02:00 | TEMPERATURE: 24.0(°C) |
| 6 | 3c | 2016/07/25 14:02:10 | HUMIDITY: 62(%) |
| ... | ... | ... | ... |

FIG. 23

| DATA ID | SENSOR ID | TIME STAMP | CONTENT |
|---|---|---|---|
| 1 | 3c | 2016/07/25 14:00:00 | 00234521 |
| 2 | 3c | 2016/07/25 14:00:10 | 14302323 |
| 3 | 3c | 2016/07/25 14:01:00 | 00234489 |
| 4 | 3c | 2016/07/25 14:01:10 | 14304120 |
| 5 | 3c | 2016/07/25 14:02:00 | 00234533 |
| 6 | 3c | 2016/07/25 14:02:10 | 14304042 |
| ... | ... | ... | ... |

FIG. 24

| DATA ID | SENSOR ID | TIME STAMP | CONTENT |
|---|---|---|---|
| 1 | 3c | 2016/07/25 14:00:00 | 00234516 |
| 2 | 3c | 2016/07/25 14:00:10 | 14302318 |
| 3 | 3c | 2016/07/25 14:01:00 | 00234484 |
| 4 | 3c | 2016/07/25 14:01:10 | 14304115 |
| 5 | 3c | 2016/07/25 14:02:00 | 00234528 |
| 6 | 3c | 2016/07/25 14:02:10 | 14304037 |
| ... | ... | ... | ... |

FIG. 25

| DATA ID | SENSOR ID | TIME STAMP | CONTENT |
|---|---|---|---|
| 1 | 3c | 2016/07/25 14:00:00 | 200234516 |
| 2 | 3c | 2016/07/25 14:00:10 | 114302318 |
| 3 | 3c | 2016/07/25 14:01:00 | 200234484 |
| 4 | 3c | 2016/07/25 14:01:10 | 214304115 |
| 5 | 3c | 2016/07/25 14:02:00 | 300234528 |
| 6 | 3c | 2016/07/25 14:02:10 | 014304037 |
| ... | ... | ... | ... |

MEDIUM STORING DATA CONVERSION PROGRAM, DATA CONVERSION DEVICE, AND DATA CONVERSION METHOD

CROSS-REFERENCE TO RELATED APPLICATION

This application is based upon and claims the benefit of priority of the prior Japanese Patent Application No. 2016-163882, filed on Aug. 24, 2016, the entire contents of which are incorporated herein by reference.

FIELD

The embodiment discussed herein is related to a medium storing a data conversion program, a data conversion device, and a data conversion method.

BACKGROUND

For example, a provider that provides users with services (hereinafter simply referred to as a provider as well) constructs and operates a job system (hereinafter referred to as information processing system as well) corresponding to applications in order to provide the users with various services. Specifically, the provider constructs an information processing system functioning as the Internet of things (IoT) system in order to, for example, analyze various data in a data center (temperature, humidity, and the like in the data center).

Such an information processing system includes, for example, a plurality of sensors (hereinafter referred to as sensor devices as well) that measure various data in the data center and a device (hereinafter referred to as information collection device as well) that collects and accumulates the data transmitted from the sensor devices. The information processing system as described above includes a device (hereinafter referred to as information analysis device as well) that acquires data accumulated in the information collection device and analyzes the acquired data.

The sensor devices included in the information processing system encrypt data to be transmitted (the data encrypted by the sensor devices is hereinafter referred to as encrypted data as well) when the sensor devices transmit data to the information collection device. When the information collection device included in the information processing system receives the encrypted data transmitted from the sensor devices, the information collection device decrypts the encrypted data and accumulates the decrypted data in a storing section. Consequently, the provider is capable of securing security of the data transmitted from the sensor devices to the information collection device (see, for example, Japanese Laid-open Patent Publication Nos. 2008-160520, 2008-124824, and 2000-138916).

When the sensor devices encrypt data to be transmitted to the information collection device, for example, every time the sensor devices transmit the encrypted data to the information collection device, the sensor devices transmit information for decrypting the encrypted data (the information hereinafter simply referred to as keys as well). Specifically, for example, upon receipt of notification that the encrypted data are received, from the information collection device, the sensor devices transmit keys for decrypting the encrypted data received by the information collection device.

However, when a large number of encrypted data are transmitted by the sensor devices (the encrypted data are transmitted a large number of times), the number of keys to be transmitted to the information collection device increases. Accordingly, in the information processing system described above, communication cost for decrypting the encrypted data is sometimes enormous depending on, for example, the number of encrypted data transmitted by the sensor devices.

SUMMARY

According to an aspect of the invention, a data conversion method performed by a computer, the method is configured to cause the computer to; when the computer receives a plurality of data, acquire first information and second information from a storage, the first information designating any data among the plurality of data, the second information designating a predetermined number of data, data formats of which are collectively converted among the plurality of data; acquire, based on the acquired first information and the acquired second information, the predetermined number of conversion target data from the received plurality of data; extract each pieces of specific information embedded in each of the acquired predetermined number of conversion target data; and convert the data format of each of the respective predetermined number of conversion target data by using the extracted predetermined number of pieces of the specific information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 22 is a diagram describing a specific example of measurement data;

FIG. 23 is a diagram describing a case in which data set in "content" in the measurement data described in FIG. 22 are converted into numerical value data;

FIG. 24 is a diagram describing a case in which a specific value is subtracted from the numerical value data set in the "content" in the measurement data described in FIG. 23; and FIG. 25 is a diagram describing a case in which a plurality of pieces of specific information are added respectively to encrypted data set in the "content" in the measurement data described with reference to FIG. 24.

DESCRIPTION OF EMBODIMENT

[Configuration of an Information Processing System]

Figure 1:
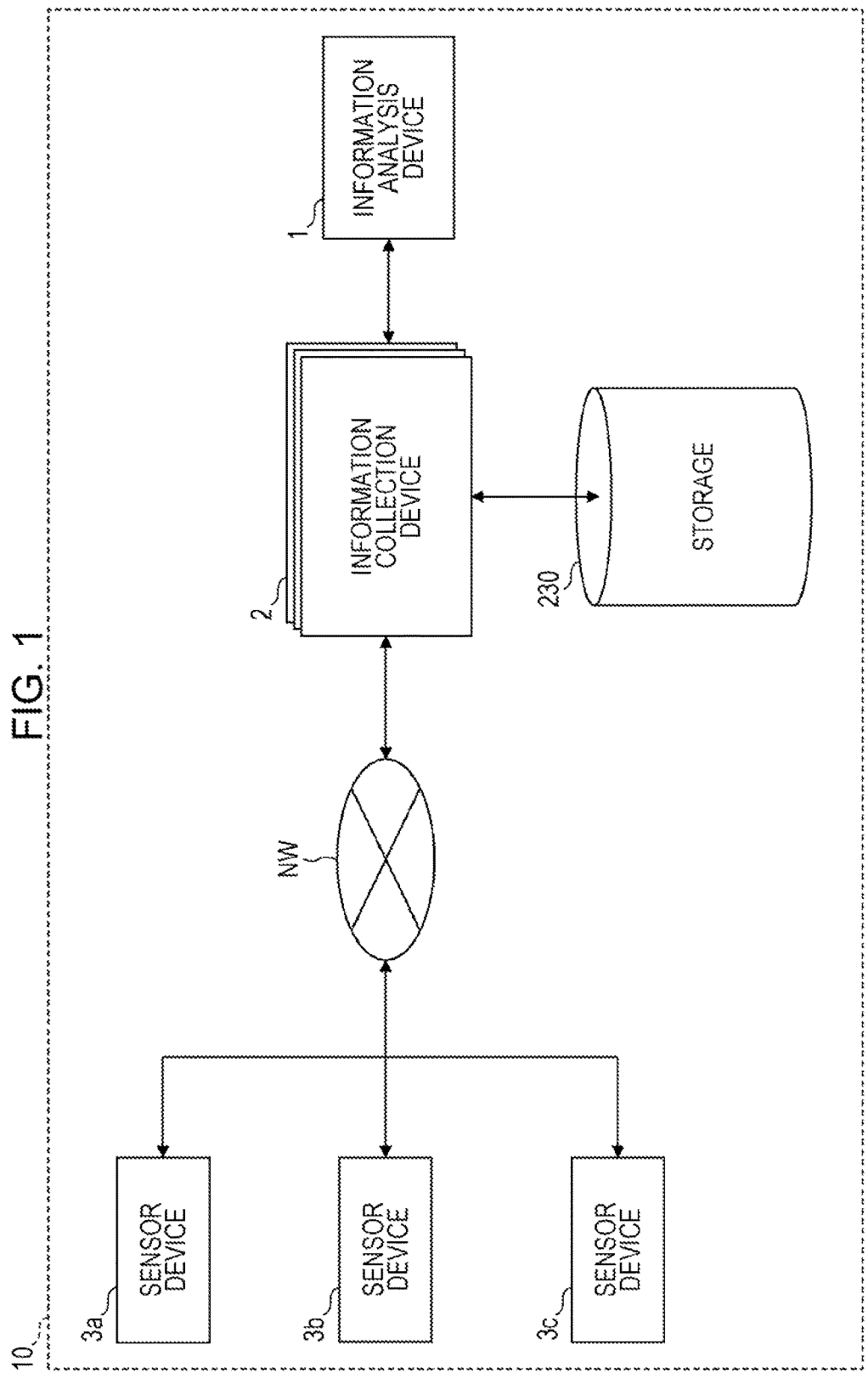
FIG. 1 is a diagram illustrating configuration of an information processing system.

FIG. 1 is a diagram illustrating configuration of an information processing system 10. The information processing system 10 illustrated in FIG. 1 includes, for example, an information analysis device 1 (may be referred to as an information processing device), an information collection device 2, and sensor devices 3a, 3b, and 3c (hereinafter collectively referred to as sensor devices 3 as well or may be referred to as information processing devices). Note that the information processing system 10 illustrated in FIG. 1 may include one, two, or more than three sensor devices 3.

The sensor devices 3 measure, for example, temperature or humidity in a data center or a factory. The sensor devices 3 measure, for example, operation states of devices (for example, power consumption and the number of revolutions of fans) provided in the data center or the like. The sensor devices 3 transmit results of the measurement to the information collection device 2.

The information collection device 2 is configured from, for example, a plurality of physical machines. The information collection device 2 collects and accumulates data transmitted from the respective sensor devices 3. Specifically, as illustrated in FIG. 1, the information collection device 2 stores data transmitted from the respective sensor devices 3 in a storage 230.

For example, when there is an input from a provider, the information analysis device 1 acquires a part of the data accumulated in the storage 230 of the information collection device 2. The information analysis device 1 analyzes the acquired data.

[Example of Processing in the Information Processing System]

Figure 2:
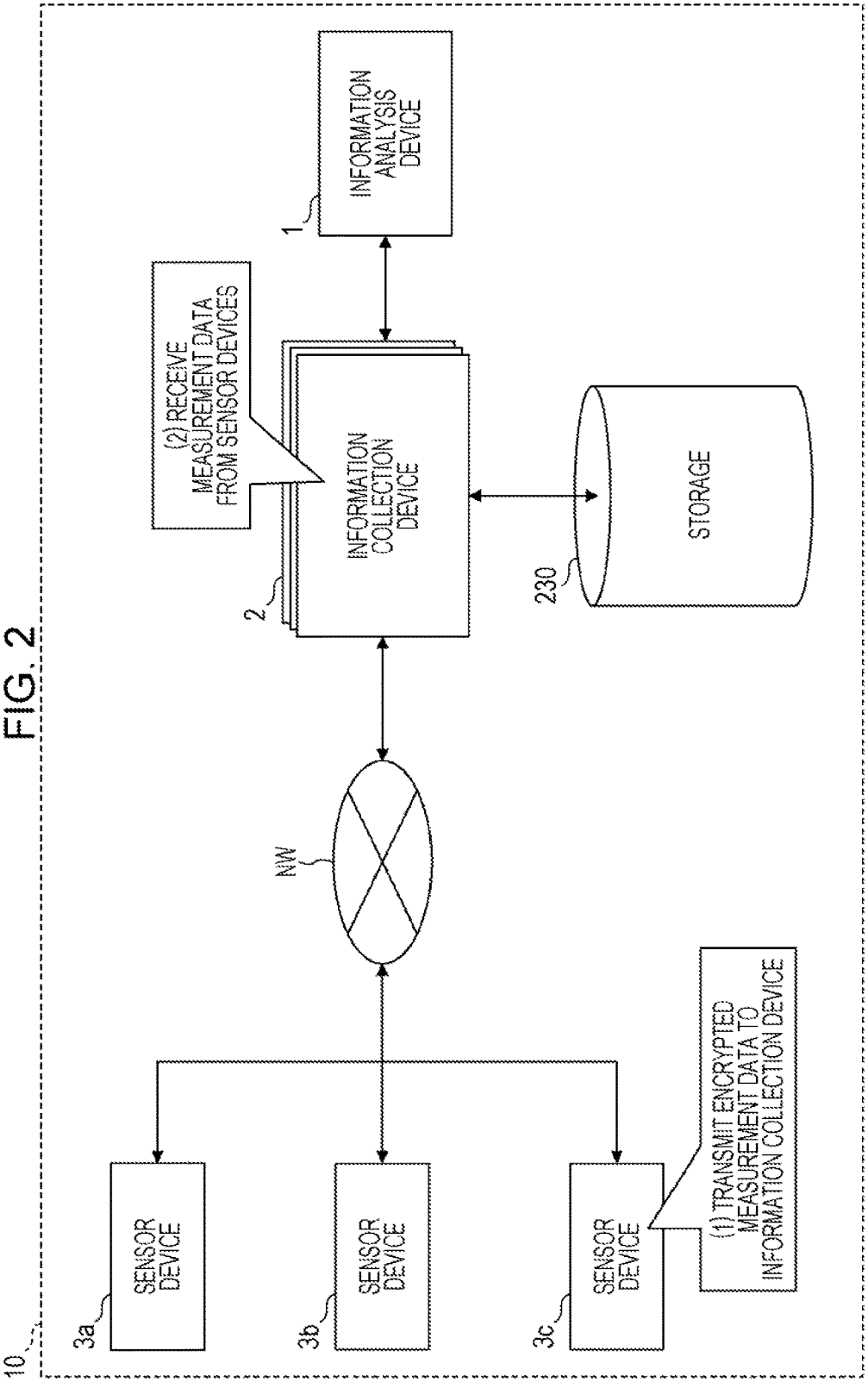
FIG. 2 is a diagram describing a specific example of processing in the information processing system.
Figure 3:
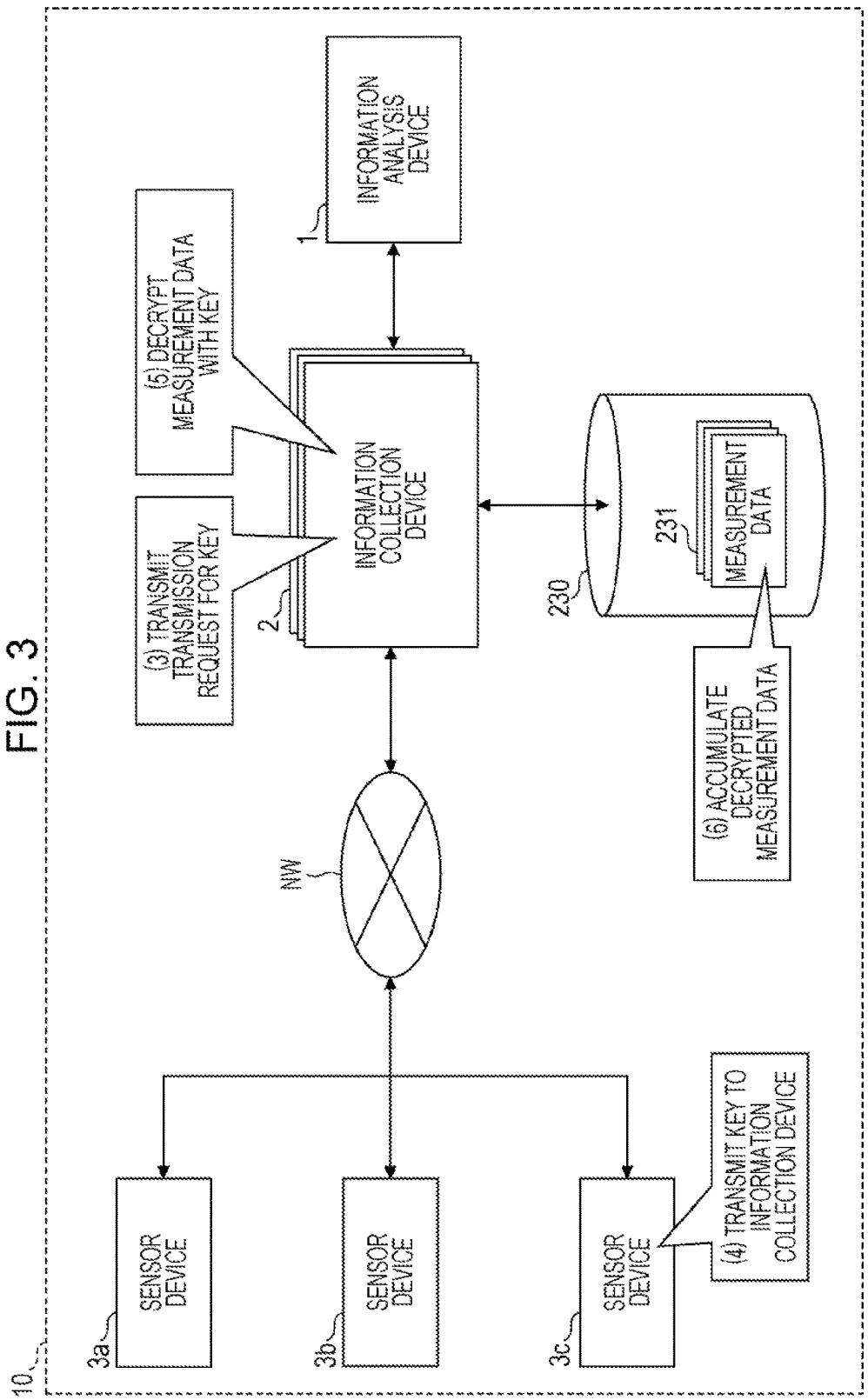
FIG. 3 is a diagram describing a specific example of the processing in the information processing system.
Figure 4:
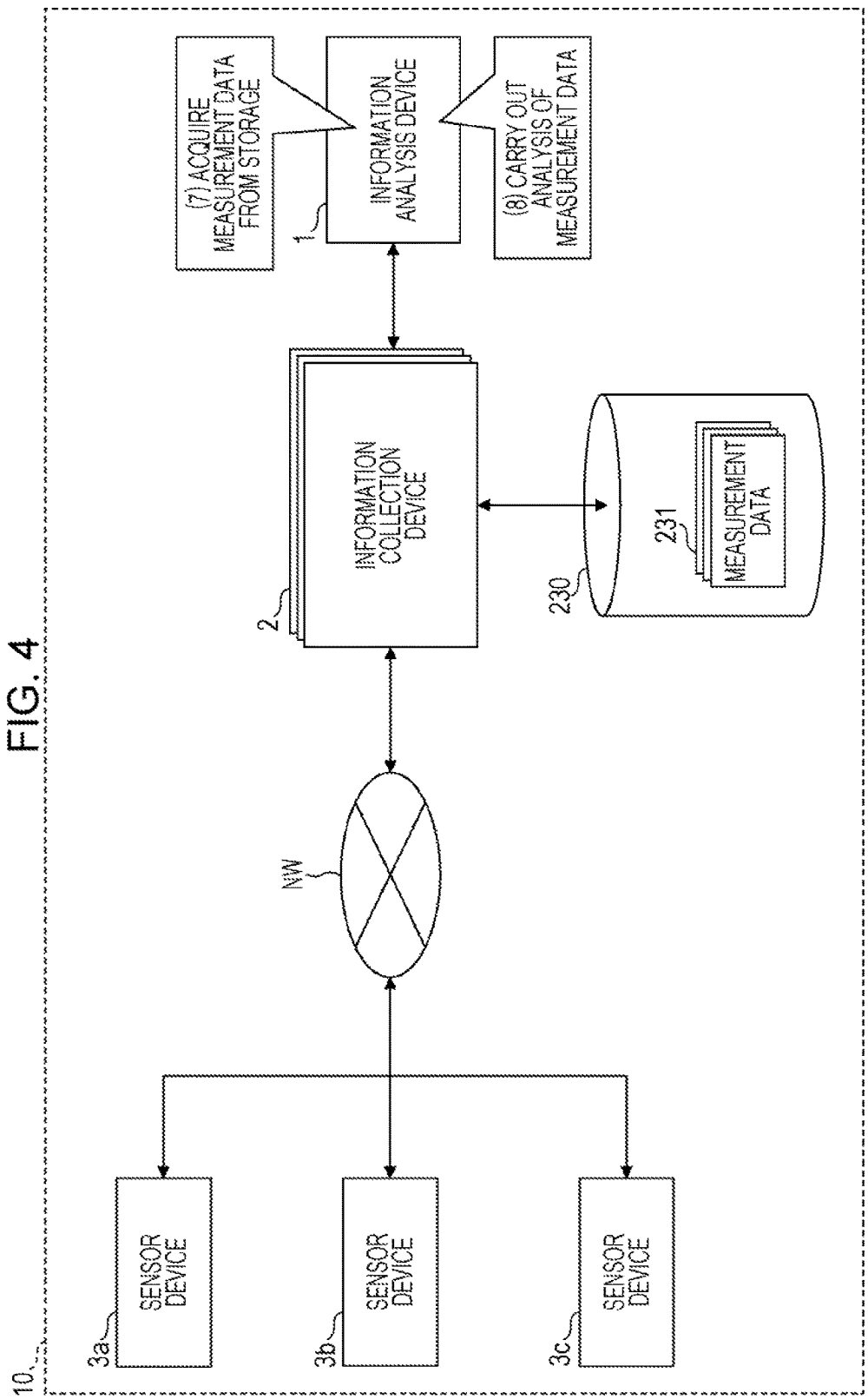
FIG. 4 is a diagram describing a specific example of the processing in the information processing system.

A specific example of processing in the information processing system 10 is described. FIGS. 2 to 4 are diagrams describing the specific example of the processing in the information processing system 10.

For example, when the sensor device 3 (in the example illustrated in FIG. 2, the sensor device 3c) measures data in the data center, the sensor device 3 generates encrypted data (hereinafter referred to as encrypted data 231a) of the measured data (hereinafter may be referred to as measurement data 231). Thereafter, as illustrated in FIG. 2, the sensor device 3 transmits the generated encrypted data 231a to the information collection device 2 ((1) in FIG. 2).

On the other hand, for example, when the information collection device 2 receives the encrypted data 231a transmitted from the sensor device 3 ((2) in FIG. 2), the information collection device 2 transmits, to the sensor device 3, a transmission request for a key for decrypting the received encrypted data 231a ((3) in FIG. 3). When the sensor device 3 receives the transmission request for the key transmitted from the information collection device 2, the sensor device 3 transmits, to the information collection device 2, the key corresponding to the received transmission request ((4) in FIG. 3).

Thereafter, the information collection device 2 decrypts, with the key transmitted from the sensor device 3, the encrypted data 231a transmitted from the sensor device 3 ((5) in FIG. 3). The information collection device 2 stores the decrypted measurement data 231 in the storage 230 ((6) in FIG. 3).

Consequently, the information processing system 10 is capable of securing security of the measurement data 231 transmitted from the sensor device 3 to the information collection device 2.

When analyzing the measurement data 231, for example, the information analysis device 1 accesses the storage 230 and acquires the measurement data 231 stored in the storage 230 ((7) in FIG. 4). The information analysis device 1 analyzes the acquired measurement data 231 ((8) in FIG. 4).

Note that, for example, when the measurement data 231 is encrypted by the information collection device 2 and then stored in the storage 230, the information analysis device 1 may decrypt the acquired measurement data 231 and then analyzes the measurement data 231. When analyzing the measurement data 231, the information analysis device 1 may transmit a transmission request for the measurement data 231 to the information collection device 2 and receive the measurement data 231 transmitted by the information collection device 2.

When the encrypted data 231a is generated from the measurement data 231, for example, every time the sensor devices 3 transmit the encrypted data 231a to the information collection device 2, the sensor devices 3 have to transmit keys for decrypting the encrypted data 231a. However, the encrypted data 231a transmitted to the information collection device 2 by the sensor devices 3 may be sometimes as large as hundreds of millions of data depending on the size of the information processing system 10. Therefore, in such case, communication cost for decrypting the encrypted data 231a is enormous.

A provider that manages the information analysis device 1 and a provider that manages the sensor devices 3 (hereinafter referred to as the provider or the like that manages the information analysis device 1 as well) are sometimes different from a provider that manages the information collection device 2. In such case, the provider or the like that manages the information analysis device 1 is sometimes desirable to hide, from the provider that manages the information collection device 2, a method of decrypting the encrypted data 231a transmitted by the sensor devices 3.

Therefore, the information analysis device 1 in this embodiment shares in advance, with the sensor devices 3, information (hereinafter referred to as first information as well) designating any measurement data 231 among a series of plurality of measurement data 231 (hereinafter simply referred to as plurality of data as well). The information analysis device 1 in this embodiment shares in advance, with the sensor devices 3, information (hereinafter referred to as second information as well) designating the number of data when converting data formats of a series of plurality of data collectively for each predetermined number of data.

On the other hand, when a plurality of encrypted data 231*a* are transmitted from the sensor devices 3, the information collection device 2 directly stores the transmitted plurality of encrypted data 231*a* in the storage 230 without decrypting the encrypted data 231*a*.

When acquiring (receiving) a series of plurality of encrypted data 231*a* from the storage 230, the information analysis device 1 acquires, based on the first information and the second information, the predetermined number of the encrypted data 231*a* (hereinafter referred to as plurality of conversion target data as well), data formats of which have to be simultaneously converted. Specifically, the information analysis device 1 acquires, for example, according to content of the first information, a predetermined number of conversion target data corresponding to the number of data corresponding to the second information from the plurality of encrypted data 231*a* stored in the storage 230. Thereafter, the information analysis device 1 acquires a predetermined number of pieces of information (hereinafter referred to as predetermined number of pieces of specific information as well) included in the acquired respective predetermined number of conversion target data and converts data formats of the respective predetermined number of conversion target data by using the acquired predetermined number of pieces of specific information.

That is, since the information analysis device 1 and the sensor devices 3 share in advance information for decrypting the encrypted data 231*a*, the sensor devices 3 do not have to transmit keys with transmission of encrypted data to the information collection device 2. Therefore, the information processing system 10 is capable of suppressing communication cost involved in the decryption of the encrypted data 231*a* transmitted by the sensor devices 3.

The information collection device 2 stores the encrypted data 231*a* transmitted by the sensor device 3 in the storage 230 without decrypting the encrypted data 231*a*. The information analysis device 1 accesses the storage 230 and acquires data in an encrypted state (the encrypted data 231*a*). Consequently, even when the provider or the like that manages the information analysis device 1 and the provider that manages the information collection device 2 are different, the provider or the like that manages the information analysis device 1 is capable of hiding, from the provider that manages the information collection device 2, a method of decrypting encrypted data transmitted by the sensor devices 3.

[Hardware Configuration of the Information Analysis Device]

Figure 5:
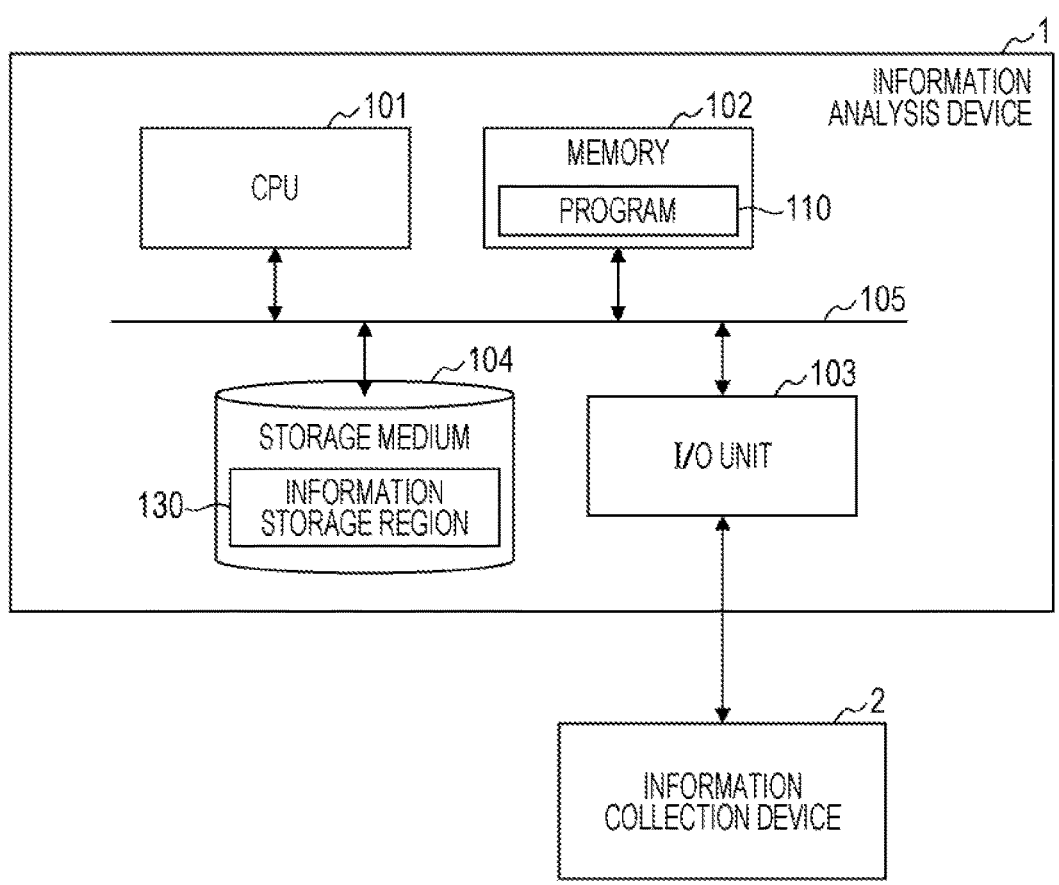
FIG. 5 is a diagram illustrating a hardware configuration of an information analysis device.

A hardware configuration of the information analysis device 1 is described. FIG. 5 is a diagram illustrating the hardware configuration of the information analysis device 1.

The information analysis device 1 includes a CPU 101, which is a processor, a memory 102, an external interface (an I/O unit) 103, and a storage medium 104. Such sections are connected to one another via a bus 105.

The storage medium 104 stores, for example, in a program storage region (not illustrated in FIG. 5) in the storage medium 104, a computer program 110 for performing processing of converting a data format (hereinafter may be referred to as data conversion processing). The storage medium 104 includes, for example, an information storage region 130 (hereinafter may be referred to as storing section 130) in which information used when performing data conversion processing is stored.

As illustrated in FIG. 5, when executing the computer program 110, the CPU 101 loads the computer program 110 from the storage medium 104 to the memory 102 and performs the data conversion processing in cooperation with the computer program 110. The external interface 103 performs, for example, communication with the information collection device 2.

[Hardware Configuration of the Information Collection Apparatus]

Figure 6:
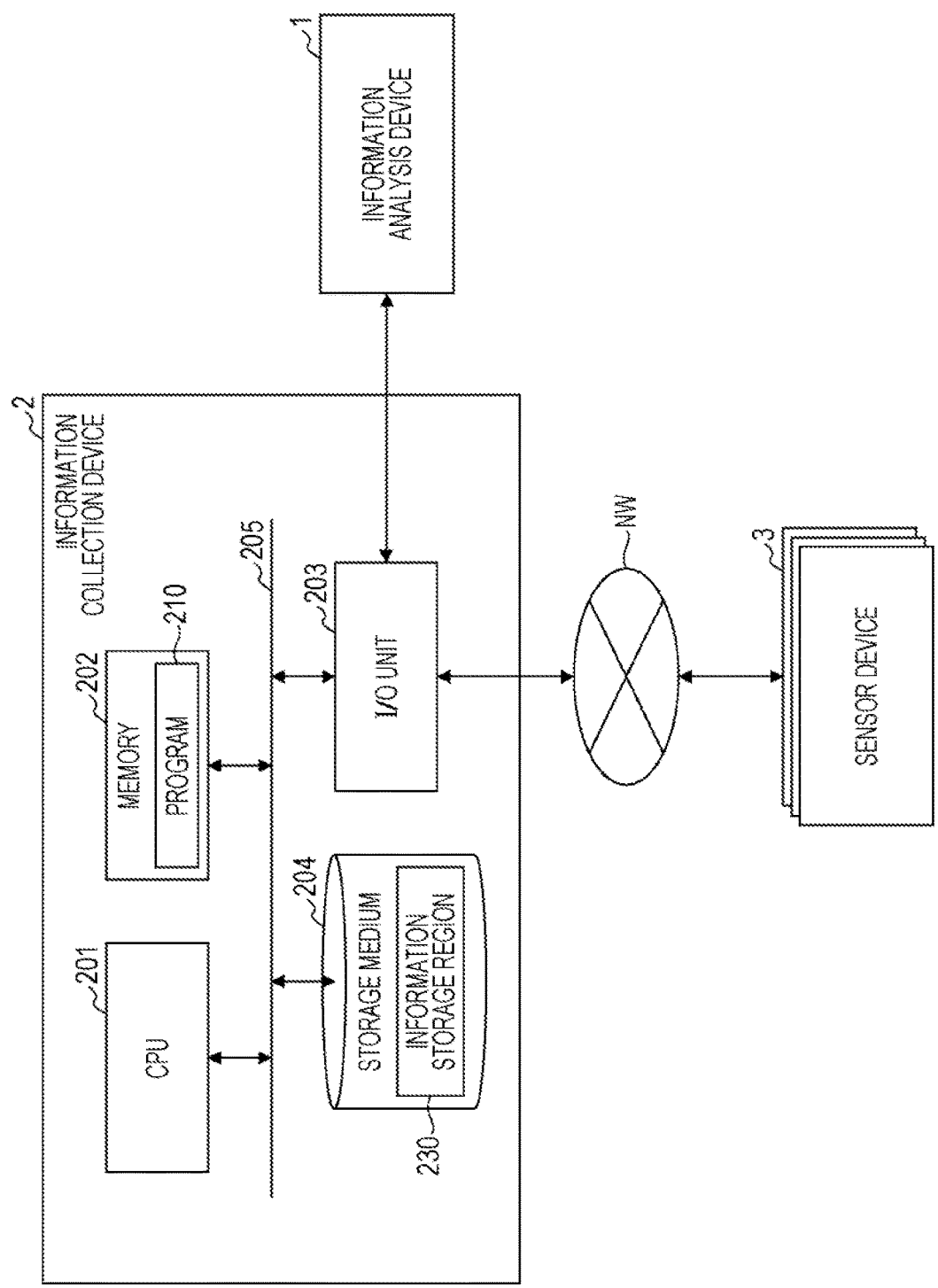
FIG. 6 is a diagram illustrating a hardware configuration of an information collection device.

A hardware configuration of the information collection device 2 is described. FIG. 6 is a diagram illustrating the hardware configuration of the information collection device 2.

The information collection device 2 includes a CPU 201, which is a processor, a memory 202, an external interface (an I/O unit) 203, and a storage medium 204. Such sections are connected to one another via a bus 205.

The storage medium 204 stores, for example, in a program storage region (not illustrated in FIG. 6) in the storage medium 204, a computer program 210 for performing the data conversion processing. The storage medium 204 includes, for example, an information storage region 230 (hereinafter may be referred to as storing section 230) in which information used in performing the data conversion processing is stored. Note that the storage 230 described with reference to FIG. 1 and the like corresponds to the information storage region 230.

As illustrated in FIG. 6, when executing the computer program 210, the CPU 201 loads the computer program 210 from the storage medium 204 to the memory 202 and performs the data conversion processing in cooperation with the computer program 210.

For example, the external interface 203 performs communication with the information analysis device 1. For example, the external interface 203 performs communication with the sensor devices 3 via a network NW.

[Hardware Configuration of the Sensor Device]

Figure 7:
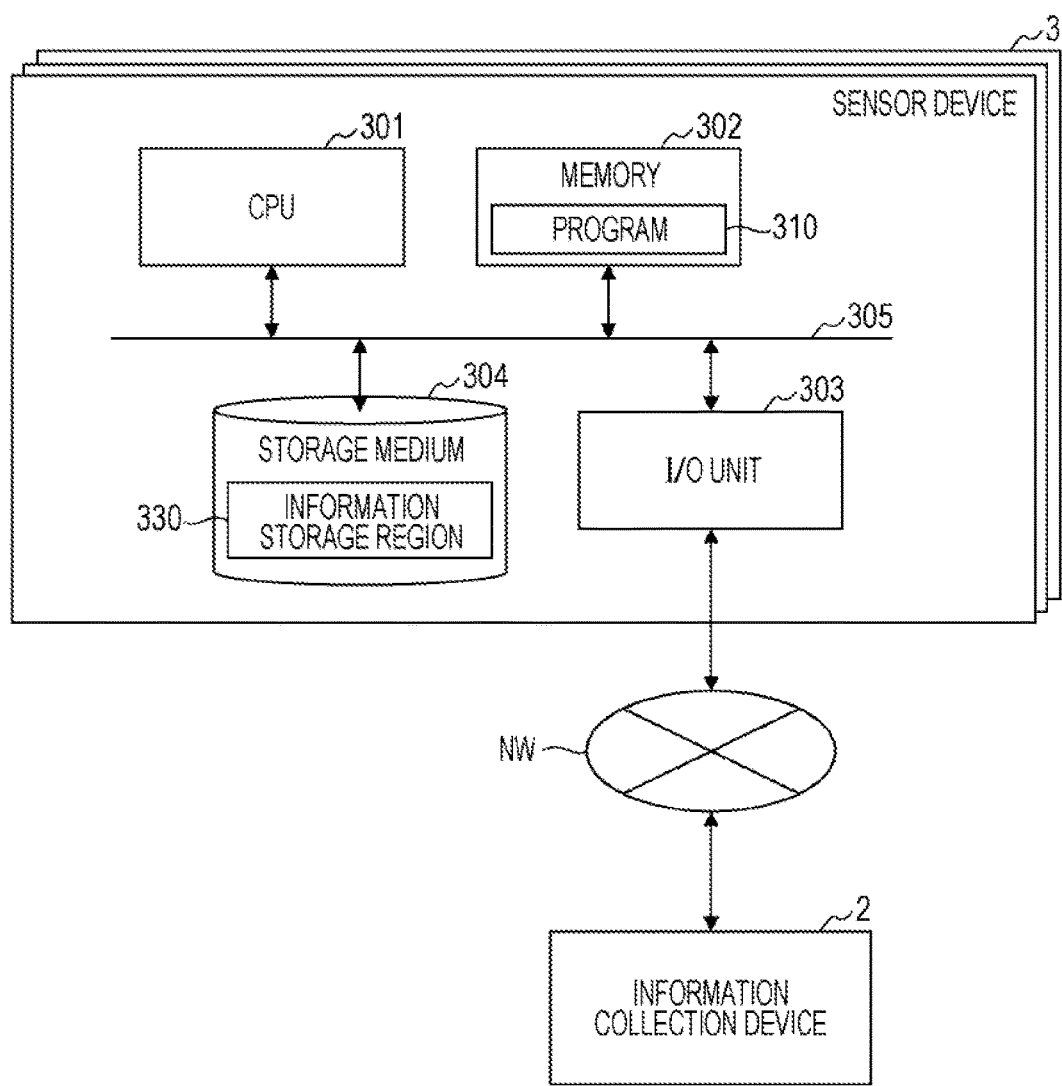
FIG. 7 is a diagram illustrating a hardware configuration of a sensor device.

A hardware configuration of the sensor device 3 is described. FIG. 7 is a diagram illustrating the hardware configuration of the sensor device 3.

The sensor device 3 includes a CPU 301, which is a processor, a memory 302, an external interface (an I/O unit) 303, and a storage medium 304. Such sections are connected to one another via a bus 305.

The storage medium 304 stores, for example, in a program storage region (not illustrated in FIG. 7) in the storage medium 304, a computer program 310 for performing data conversion processing. The storage medium 304 includes, for example, an information storage region 330 (hereinafter referred to as storing section 330 as well) in which information used in performing the data conversion processing is stored.

As illustrated in FIG. 7, when executing the computer program 310, the CPU 301 loads the computer program 310 from the storage medium 304 to the memory 302 and performs the data conversion processing in cooperation with the computer program 310. For example, the external interface 303 performs communication with the information collection device 2 via the network NW.

[Functions of the Information Analysis Device]

Figure 8:
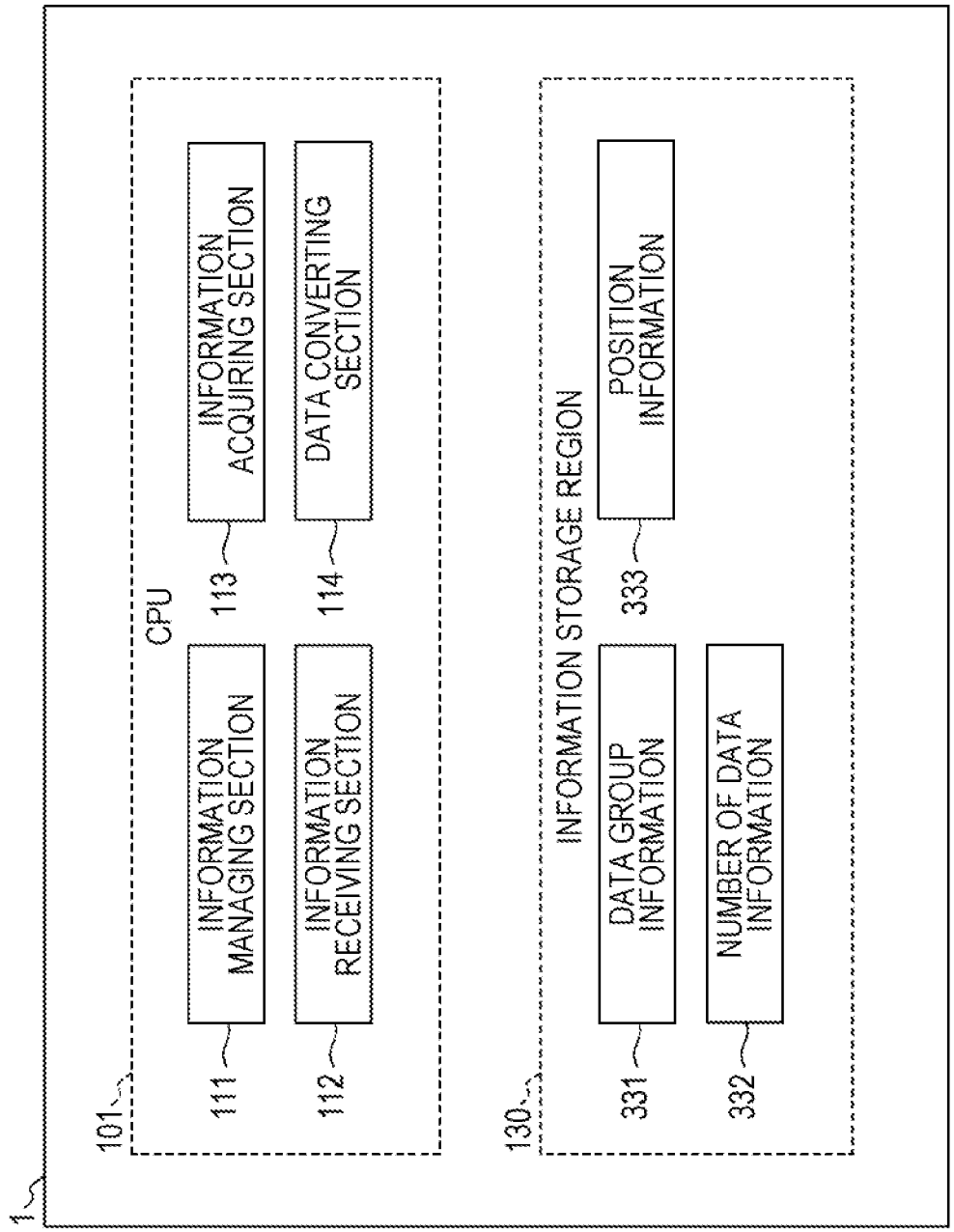
FIG. 8 is a functional block diagram of the information analysis device.

Functions of the information analysis device 1 are described. FIG. 8 is a functional block diagram of the information analysis device 1.

The CPU 101 of the information analysis device 1 cooperates with the computer program 110 to thereby operate as, for example, an information managing section 111, an information receiving section 112, an information acquiring section 113, and a data converting section 114. In the information storage region 130, for example, first information 331 (hereinafter referred to as data group information 331 as well), second information 332 (hereinafter referred to as number of data information 332 as well), and position information 333 are stored.

The information managing section 111 stores, for example, the data group information 331, the number of data information 332, and the position information 333 transmitted from the sensor device 3 in the information storage region 130. Note that, when the sensor devices 3 transmit different pieces of data group information 331 or the like, for example, the information managing section 111 stores the data group information 331 or the like for each of the sensor devices 3.

The data group information 331 is information referred to when a predetermined number of conversion target data (hereinafter referred to as data group as well), data formats of which have to be simultaneously converted, are designated among the encrypted data 231a acquired from the information collection device 2. Specifically, the data group information 331 is, for example, information indicating that the encrypted data 231a is designated in descending order of times corresponding to the data (for example, acquisition times in the sensor devices 3). The number of data information 332 is information indicating the number of the encrypted data 231a included in the data group.

Further, the position information 333 is information designating positions where a plurality of pieces of specific information used when data formats are converted are respectively embedded in the respective encrypted data 231a acquired from the information storage region 230. Specifically, the position information 333 is, for example, information indicating positions of the heads of the data. The position information 333 is, for example, information designating last positions of the data. Specific examples of the data group information 331, the number of data information 332, and the position information 333 are described below.

The information receiving section 112 receives the data group information 331, the number of data information 332, and the position information 333 transmitted from the sensor device 3. The information receiving section 112 acquires (receives) the encrypted data 231a stored in the information storage region 230 of the information collection device 2.

The information acquiring section 113 acquires the data group information 331 and the number of data information 332 stored in the information storage region 130. The information acquiring section 113 acquires, based on the acquired data group information 331 and number of data information 332, from the encrypted data 231a received by the information receiving section 112, a plurality of conversion target data corresponding to the number of data indicated by the number of data information 332. Thereafter, the information acquiring section 113 acquires the position information 333 stored in the information storage region 130. The information acquiring section 113 acquires (extracts) a plurality of pieces of specific information respectively from positions indicated by the position information 333 in the acquired plurality of conversion target data. A specific example in which the information acquiring section 113 acquires the plurality of pieces of specific information is described below.

The data converting section 114 converts data formats of the plurality of conversion target data respectively using the plurality of pieces of specific information acquired by the information acquiring section 113. A specific example in which the data converting section 114 converts the data formats is described below.

[Functions of the Information Collection Device]

Figure 9:
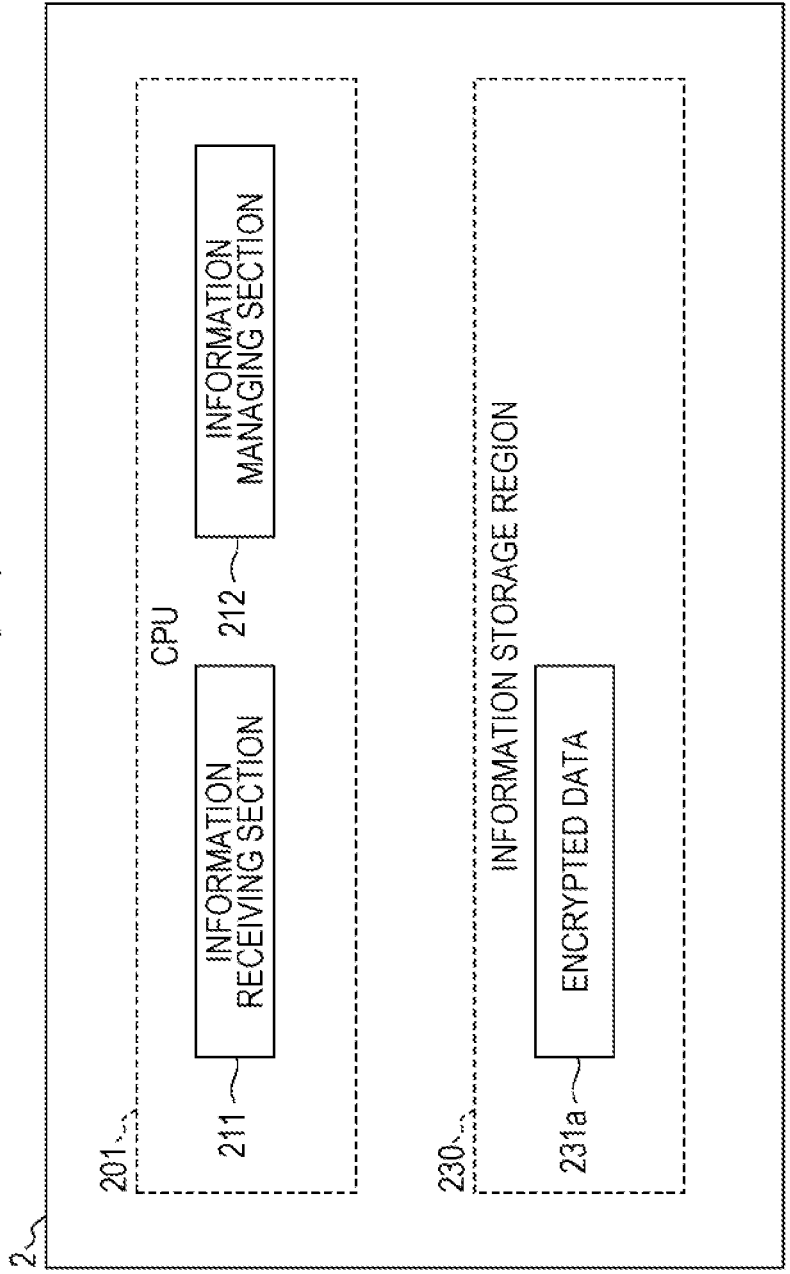
FIG. 9 is a functional block diagram of the information collection device.

Functions of the information collection device 2 are described. FIG. 9 is a functional block diagram of the information collection device 2.

The CPU 201 of the information collection device 2 cooperates with the computer program 210 to thereby operate as, for example, an information receiving section 211 and an information managing section 212. The encrypted data 231a transmitted from the sensor devices 3 are stored in the information storage region 230.

The information receiving section 211 receives the encrypted data 231a transmitted from the sensor devices 3. The information managing section 212 stores the encrypted data 231a received by the information receiving section 211 in the information storage region 230.

[Functions of the Sensor Device]

Figure 10:
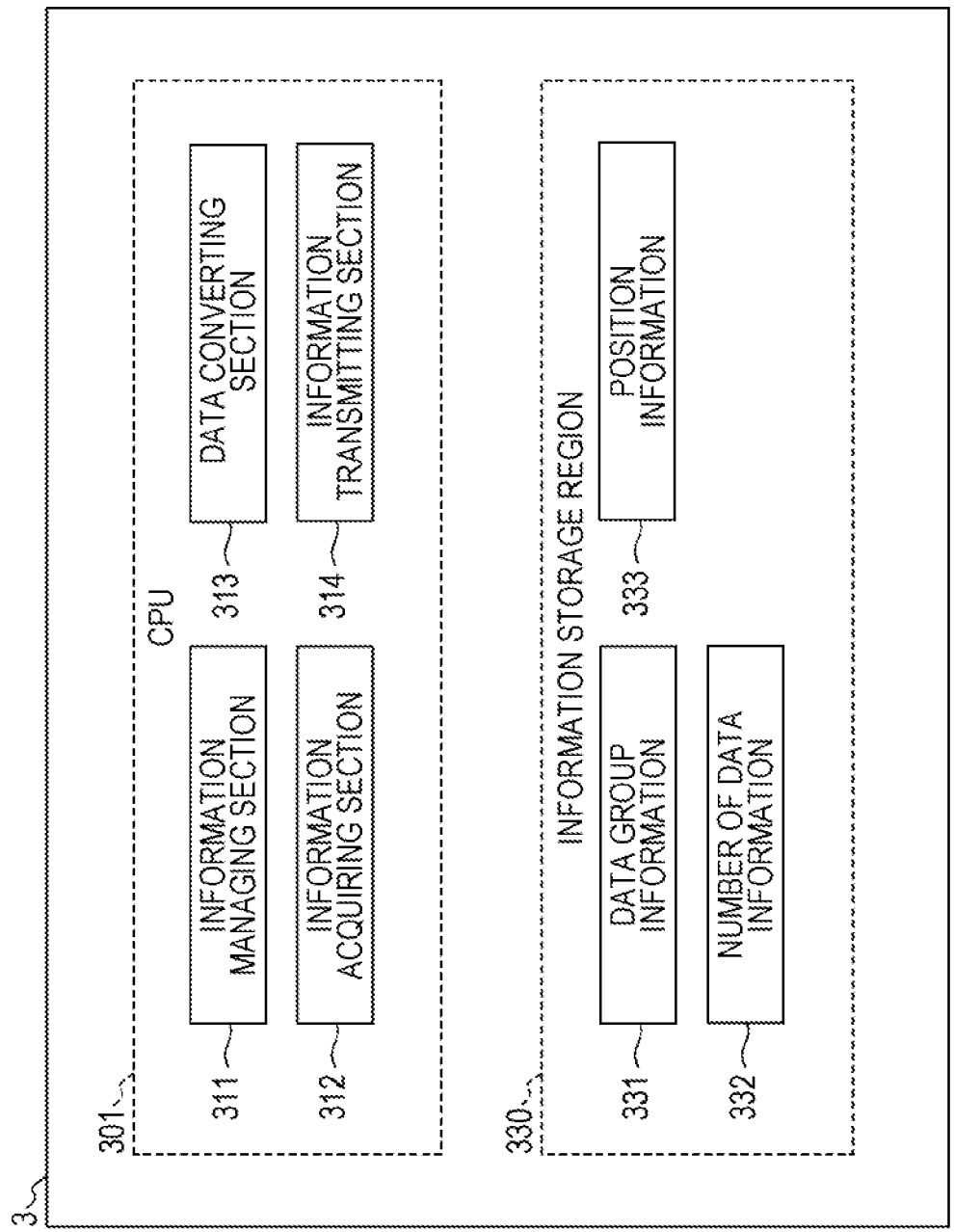
FIG. 10 is a functional block diagram of the sensor device.

Functions of the sensor device 3 are described. FIG. 10 is a functional block diagram of the sensor device 3.

The CPU 301 of the sensor device 3 cooperates with the computer program 310 to thereby operate as, for example, an information managing section 311, an information acquiring section 312, a data converting section 313, and an information transmitting section 314. The data group information 331, the number of data information 332, and the position information 333 are stored in the information storage region 330.

For example, when the provider inputs the data group information 331, the number of data information 332, and the position information 333, the information managing section 311 stores the inputted information in the information storage region 330. Note that the information managing section 311 may store a plurality of measurement data 231 measured by the sensor device 3 in the information storage region 330.

The information acquiring section 312 acquires the data group information 331 and the number of data information 332 stored in the information storage region 330.

The data converting section 313 converts, for each of data groups including the measurement data 231 as many as the number indicated by the number of data information 332, by using specific values, which are keys for converting the measurement data 231 into the encrypted data 231a, data formats of the plurality of measurement data 231 measured by the sensor device 3 and generates a plurality of encrypted data 231a. For example, the specific values may be stored in advance in the information storage region 330 by the provider or may be changed under predetermined conditions or changed periodically.

The data converting section 313 adds, for each of the data groups including the encrypted data 231a as many as the number indicated by the number of data information 332, each of values (values indicated by a plurality of pieces of specific information), a sum of which is a specific value, to positions indicated by the position information 333 in the respective encrypted data 231a. That is, the data converting section 313 adds a plurality of pieces of specific information generated by dividing the specific value to the respective encrypted data 231a. Note that the specific information may be added to the encrypted data 231a one by one. However, two or more pieces of the specific information may also be added to each of the encrypted data 231a at a time. In that case, the position information has to indicate two or more positions.

The information transmitting section 314 transmits the encrypted data 231a generated by the data converting section 313 to the information collection device 2.

Note that the data group information 331, the number of data information 332, the position information 333, the specific value, and the like may be changed, for example, at predetermined timing. In this case, the sensor devices 3 and the information analysis device 1 have to share in advance the data group information 331 and the like and information indicating timing when the data group information 331 and the like are changed.

Embodiment

Figure 11:
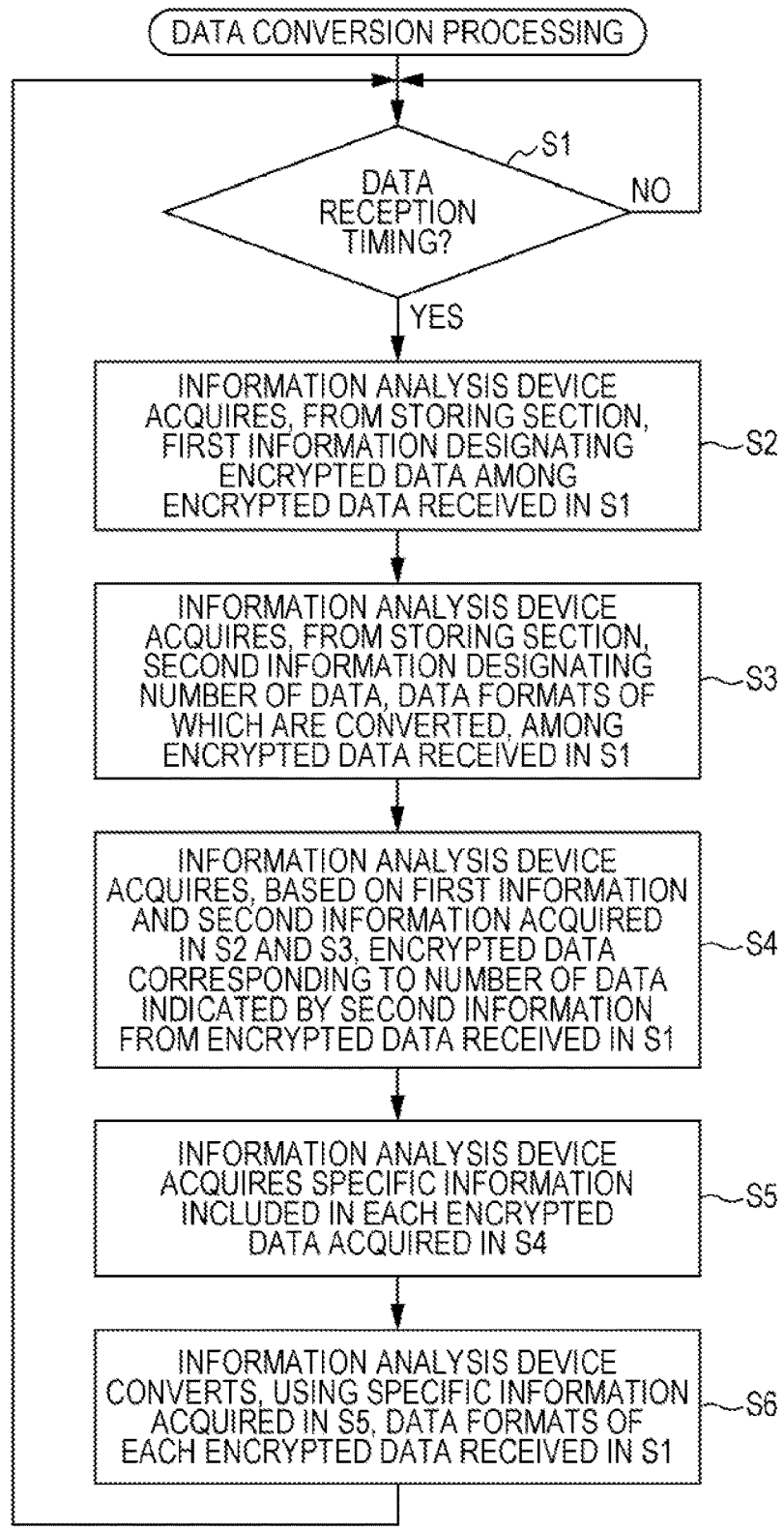
FIG. 11 is a flowchart describing an overview of data conversion processing according to an embodiment.

An embodiment is described. FIG. 11 is a flowchart describing an overview of data conversion processing in the embodiment.

The information analysis device 1 stays on standby until data reception timing (NO in S1). The data reception timing is, for example, timing when the information analysis device 1 receives the encrypted data 231a from the information storage region 230 of the information collection device 2, to analyze the measurement data 231 by the provider.

If the data reception timing comes (YES in S1), the information analysis device 1 acquires, from the information storage region 130, the data group information 331 designating any encrypted data 231a among the encrypted data 231a received in the processing in S1 (S2). In this case, the information analysis device 1 acquires, from the information storage region 130, the number of data information 332 designating the number of data, data formats of which are converted, among the encrypted data 231a received in the processing in S1 (S3).

That is, the provider stores information for decrypting the encrypted data 231a in the information storage region 130 in advance. In processing in S2 and S3, the information analysis device 1 accesses the information storage region 130 and acquires the data group information 331 and the number of data information 332.

Thereafter, the information analysis device 1 acquires, based on the data group information 331 and the number of data information 332 acquired in the processing in S2 and S3, a plurality of conversion target data corresponding to the number of data indicated by the number of data information 332 from the encrypted data 231a received in the processing in S1 (S4). Specifically, for example, the information analysis device 1 acquires, from the encrypted data 231a received in the processing in S1, as the plurality of conversion target data, the encrypted data 231a as many as the number indicated by the number of data information 332 in descending order of transmission time (time of transmission from the sensor device 3 to the information collection device 2).

Further, the information analysis device 1 acquires a plurality of pieces of specific information included respectively in the plurality of conversion target data acquired in the processing in S4 (S5). Specifically, the information analysis device 1 refers to the position information 333 stored in the information storage region 130 to thereby acquire a predetermined number of pieces of specific information included in the respective conversion target data.

The information analysis device 1 converts data formats of the respective predetermined number of conversion target data using the predetermined number of pieces of specific information acquired in the processing in S5 (S6). Specifically, the information analysis device 1 substitutes, for example, a sum of values indicated by the predetermined number of pieces of specific information acquired in the processing in S5 and values indicated by the respective predetermined number of conversion target data in an expression decided in advance to thereby convert the data format of the respective predetermined number of conversion target data.

That is, the information analysis device 1 shares in advance, with the sensor devices 3, information for decrypting the encrypted data 231a transmitted by the sensor devices 3. The information analysis device 1 refers to the information shared with the sensor devices 3 and performs decryption (a change of data formats) of the encrypted data 231a.

Consequently, the sensor devices 3 do not have to transmit keys, for example, every time the sensor devices 3 transmit encrypted data to the information collection device 2. Therefore, the information processing system 10 is capable of suppressing communication cost involved in the decryption of the encrypted data 231a transmitted by the sensor devices 3.

Details of the Embodiment

Details of the data conversion processing in the embodiment are described. First, in the data conversion processing in the embodiment, processing of sharing the data group information 331 and the like (hereinafter referred to as information sharing processing as well) is described.

[Information Sharing Processing]

Figure 12:
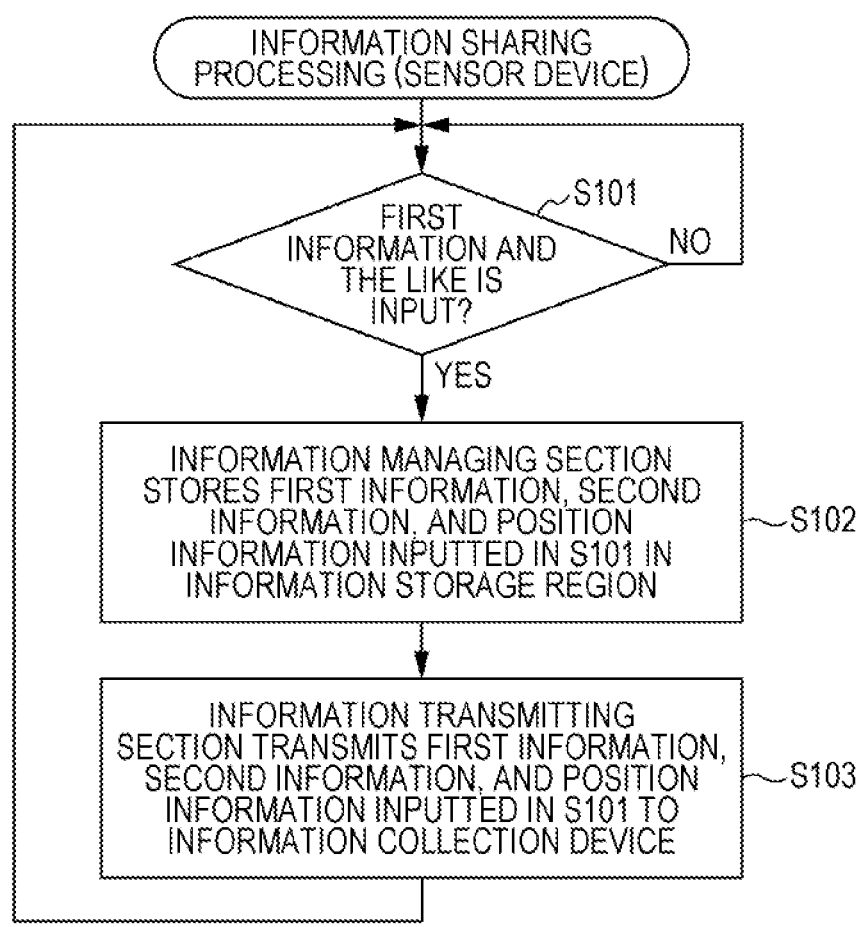
FIG. 12 is a flowchart describing information sharing processing in the embodiment.
Figure 13:
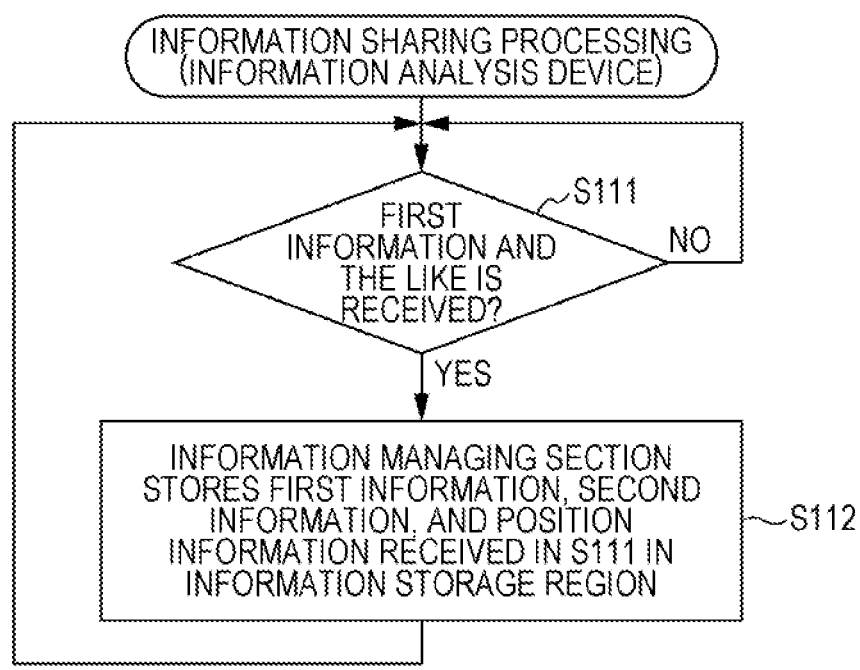
FIG. 13 is a flowchart describing the information sharing processing in the embodiment.
Figure 14:
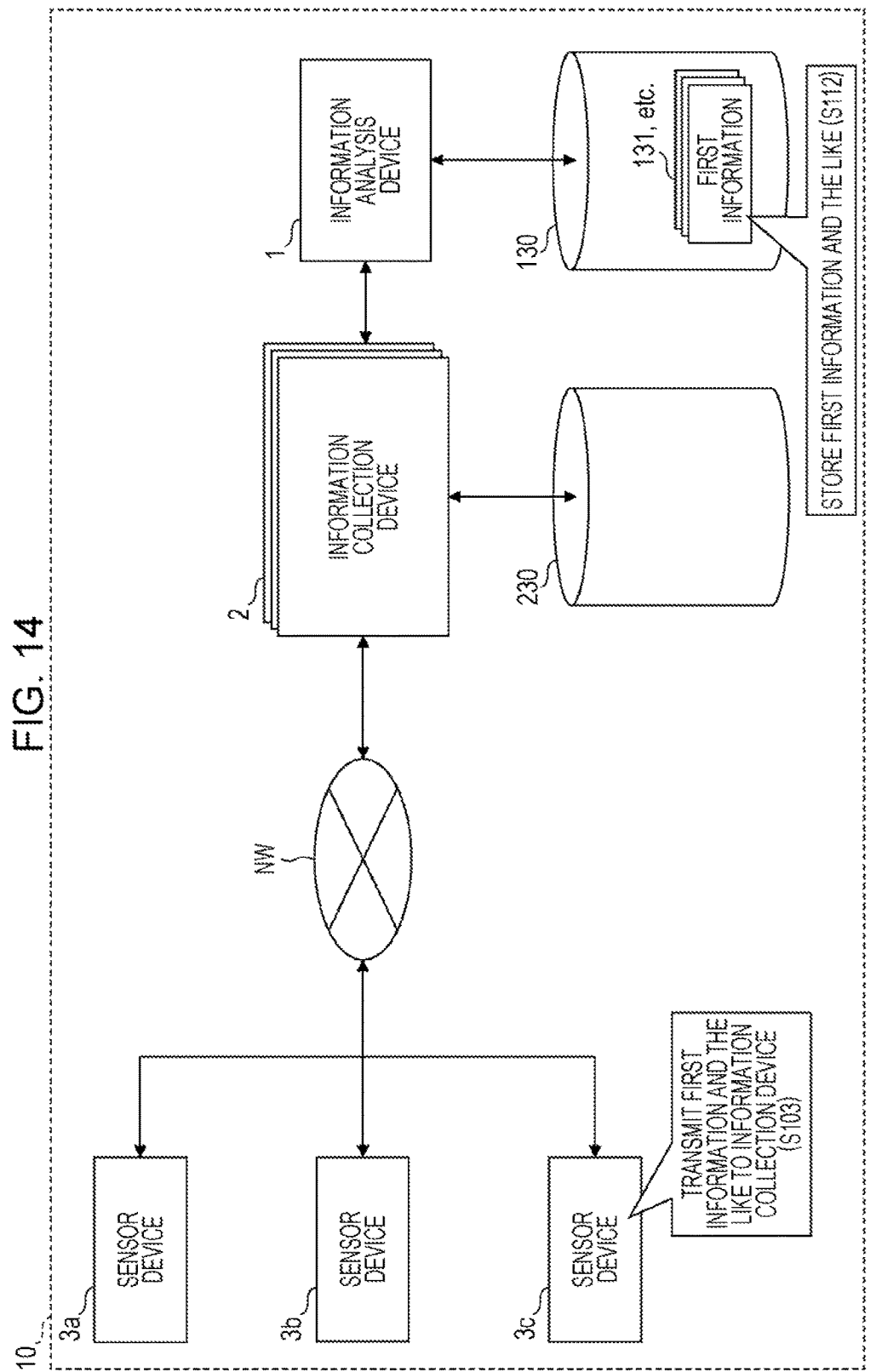
FIG. 14 is a diagram describing the information sharing processing in the embodiment.
Figure 15:
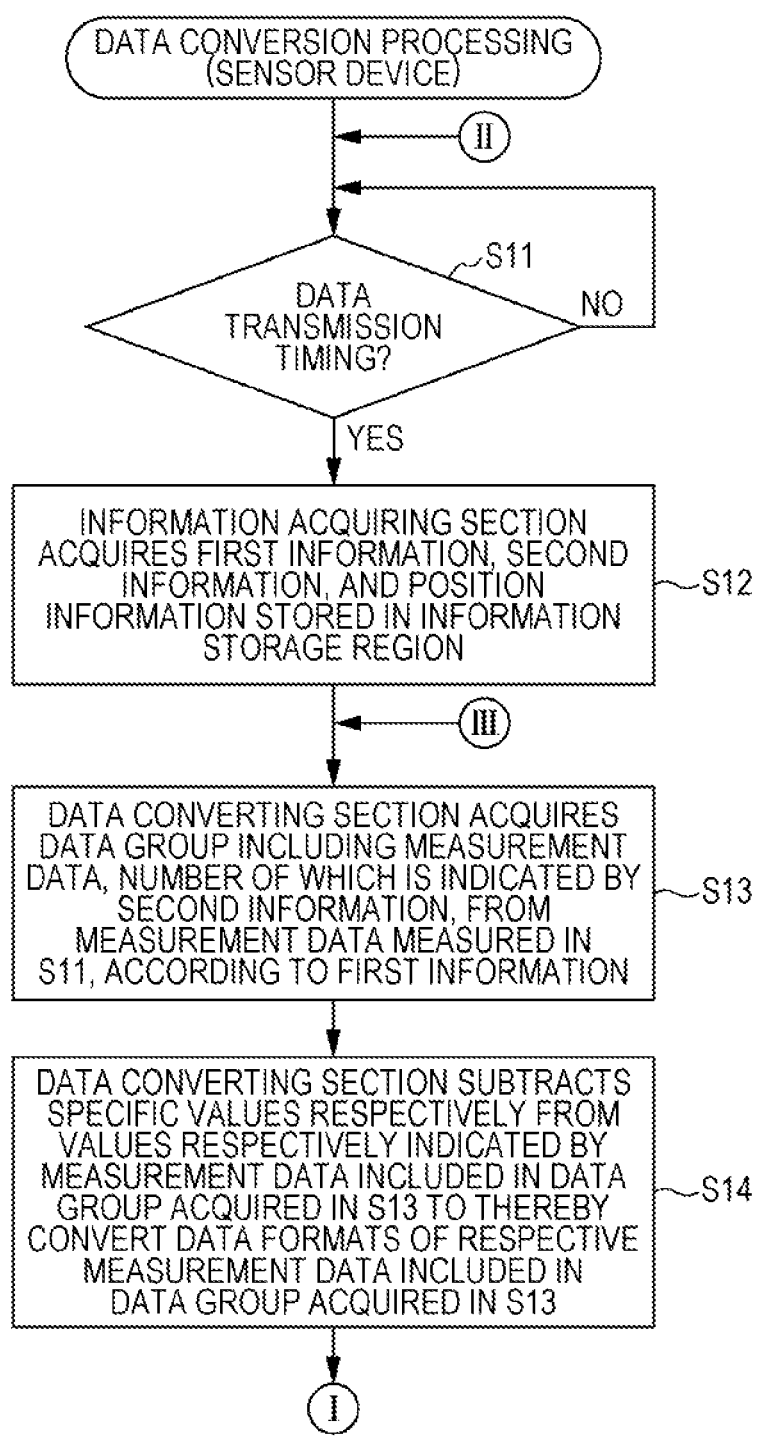
FIG. 15 is a flowchart describing the data conversion processing in the embodiment.
Figure 16:
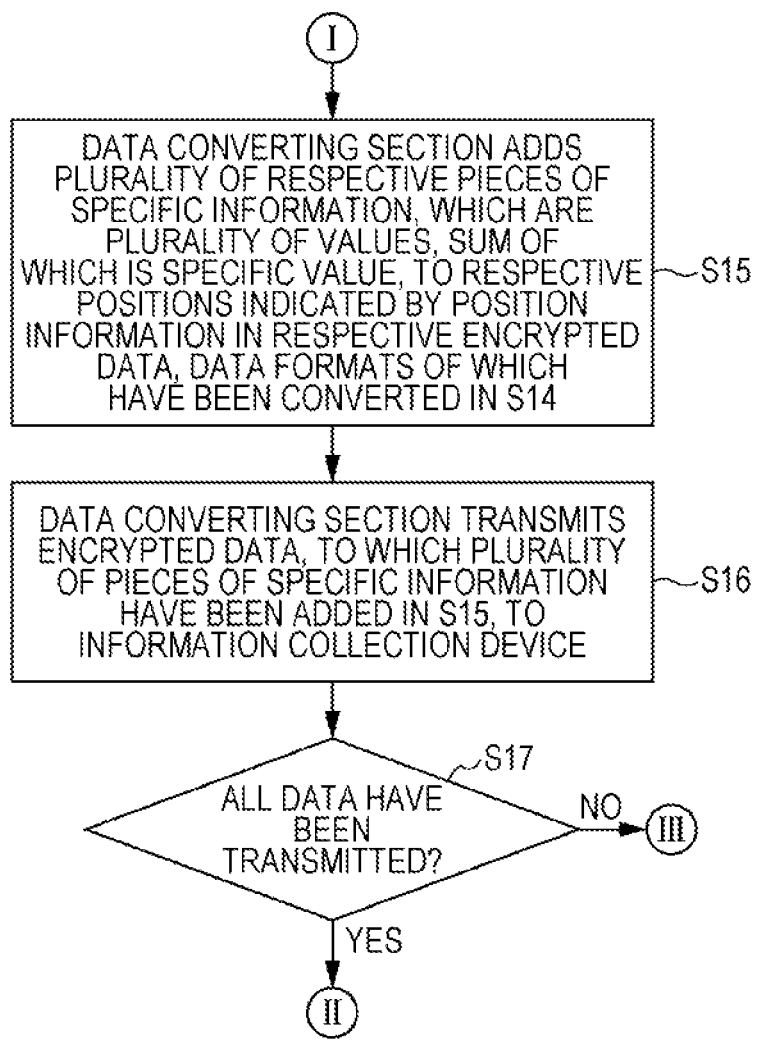
FIG. 16 is a flowchart describing the data conversion processing in the embodiment.

FIGS. 12 and 13 are flowcharts describing the information sharing processing in the embodiment. FIG. 14 is a diagram describing the information sharing processing in the embodiment. The information sharing processing illustrated in FIGS. 12 and 13 is described with reference to FIG. 14.

First, the information sharing processing in the sensor devices 3 is described. As illustrated in FIG. 12, the information managing sections 311 of the sensor devices 3 stay on standby, for example, until the data group information 331, the number of data information 332, and the position information 333 are inputted by the provider (NO in S101).

If the data group information 331 and the like is inputted (YES in S101), the information managing sections 311 of the sensor devices 3 respectively store the data group information 331, the number of data information 332, and the position information 333 inputted in the processing in S101 in the information storage regions 330 (S102). In this case, as illustrated in FIG. 14, the information transmitting sections 314 of the sensor devices 3 respectively transmit the data group information 331, the number of data information 332, and the position information 333 inputted in the processing in S101 to the information analysis device 1 (S103).

The information sharing processing in the information analysis device 1 is described. As illustrated in FIG. 13, the information receiving section 112 of the information analysis device 1 stays on standby until the information receiving section 112 receives the data group information 331, the number of data information 332, and the position information 333 from the sensor devices 3 (NO in S111).

If the information receiving section 112 of the information analysis device 1 receives the data group information 331 and the like (YES in S111), as illustrated in FIG. 14, the information managing section 111 of the information analysis device 1 stores the data group information 331, the number of data information 332, and the position information 333 received in the processing in S111 in the information storage region 130 (S112).

That is, the information analysis device 1 and the sensor devices 3 share information for decrypting the encrypted data 231a before the information analysis device 1 acquires the encrypted data 231a from the information collection device 2. Consequently, for example, every time the sensor devices 3 transmit the encrypted data 231a to the information collection device 2, the sensor devices 3 do not have to transmit keys corresponding to the encrypted data 231a. Therefore, the information processing system 10 is capable of suppressing communication cost involved in the decryption of the encrypted data 231a transmitted by the sensor devices 3.

Since the information for decrypting the encrypted data 231a is shared between the information analysis device 1 and the sensor devices 3, the sensor devices 3 are capable of transmitting the encrypted data 231a to the information collection device 2 in an encrypted state. Therefore, even if the provider or the like that manages the information analysis device 1 and the provider that manages the information collection device 2 are different, the provider or the like that manages the information analysis device 1 is capable of hiding, from the provider that manages the information collection device 2, a method of decrypting encrypted data transmitted by the sensor device 3.

[Details of the Data Conversion Processing]

Details of the data conversion processing in the embodiment are described. FIGS. 15 to 19 are flowcharts describing the data conversion processing in the embodiment. FIGS. 20 to 25 are diagrams describing the data conversion processing in the embodiment. The data conversion processing illustrated in FIGS. 15 to 19 is described with reference to FIGS. 20 to 25.

First, the data conversion processing in the sensor device 3 is described. The information managing section 311 of the sensor device 3 stays on standby until data transmission timing comes (NO in S11). The data transmission timing may be timing when the sensor device 3 acquires the measurement data 231 (for example, temperature and the like in the data center). A specific example of the measurement data 231 is described below.

[Specific Example of the Measurement Data]

FIG. 22 is a diagram describing a specific example of the measurement data 231. The measurement data 231 illustrated in FIG. 22 includes, as items, a "data ID" for identifying data included in the measurement data 231, a "sensor ID" for identifying the sensor device 3 that acquires the measurement data 231, and a "time stamp" indicating time when the measurement data 231 is acquired. The measurement data 231 illustrated in FIG. 22 includes, as an item, a "content" in which content of the measurement data 231 is set.

Specifically, the measurement data 231 illustrated in FIG. 22 indicates that, in the data, the "data ID" of which is "1", the "sensor ID" is "3c (the sensor device 3c)", the "time stamp" is "2016/07/25 14:00:00", and the "content" is "temperature: 23.5 (° C.)". Concerning other data included in FIG. 22, explanation is omitted.

Referring back to FIG. 15, if the data transmission timing comes (YES in S11), the information acquiring section 312 of the sensor device 3 acquires the data group information 331, the number of data information 332, and the position information 333 stored in the information storage region 330 (S12). In this case, the information acquiring section 312 acquires a data group including the measurement data 231 the number of which is indicated by the number of data information 332, from the measurement data 231 measured in the processing in S11, according to content of the data group information 331 (S13).

The data converting section 313 of the sensor device 3 subtracts a specific value respectively from values indicated by the respective measurement data 231 included in the data group acquired in the processing in S13 to thereby convert data formats of the respective measurement data 231 included in the data group acquired in the processing in S13 and generate the encrypted data 231a (S14). The data converting section 313 may perform the processing in S14, for example, by referring to the specific values stored in the information storage region 330.

Specifically, for example, the data converting section 313 converts the data set in the "content" in the measurement data 231 described with reference to FIG. 22 into numerical value data and calculates numerical value data obtained by subtracting specific values from the converted numerical value data to thereby generate the encrypted data 231a from the measurement data 231. A specific example in generating the encrypted data 231a from the measurement data 231 is described.

[Specific Example in Generating the Encrypted Data 231a from the Measurement Data 231]

FIG. 23 is a diagram describing a case in which the data set in the "content" in the measurement data 231 described with reference to FIG. 22 are converted into numerical value data.

As illustrated in FIG. 23, the data converting section 313 converts, for example, according to a conversion rule decided in advance, the data set in the "content" in the measurement data described with reference to FIG. 22 into numerical value data. Specifically, for example, as illustrated in FIG. 23, the data converting section 313 sets, in the "content" of the data, the "data ID" of which is "1", in the measurement data 231, "00234521", which is numerical value data obtained by converting "temperature: 23.5 (° C.)" set in the "content" of the data, the "data ID" of which is "1", in the measurement data 231 described with reference to FIG. 22. Explanation is omitted concerning the other data included in FIG. 23.

Subsequently, the data converting section 313 subtracts a specific value from the numerical value data set in the "content" in the measurement data 231 described with reference to FIG. 23. FIG. 24 is a diagram describing a case in which the specific value is subtracted from the numerical value data set in the "content" in the measurement data 231 described with reference to FIG. 23. In the following explanation, it is assumed that the specific value is "5".

For example, the data converting section 313 sets "00234516", which is numerical value data obtained by subtracting "5" from "00234521", in the "content" of the data, the "data ID" of which is "1", in the measurement data 231 illustrated in FIG. 24. Consequently, the data converting section 313 is capable of encrypting the data set in the "content" in the measurement data 231 described with reference to FIG. 22. Explanation is omitted concerning the other data included in FIG. 24.

Referring back to FIG. 16, the data converting section 313 adds a plurality of pieces of specific information, which are a plurality of values, a sum of which is a specific value, respectively to positions indicated by the position information 333 in the respective encrypted data 231a, the data formats of which have been converted in the processing in S14 (S15). In the following explanation, it is assumed that the data group information 331 is information indicating that the respective measurement data 231 are designated in descending order of times indicated by the time stamp. It is assumed that the number indicated by the number of data information 332 is "3".

Specifically, in the "time stamp" of the data in the encrypted data 231a described with reference to FIG. 24, earlier time is set as a value indicated by the "data ID" is smaller. Therefore, in this case, the data converting section 313 determines that the encrypted data 231a, the "data ID" of which is "1", "2", and "3", among the data included in the encrypted data 231a described with reference to FIG. 24 are included in the same data group. Furthermore, the data converting section 313 determines that the encrypted data 231a, the "data ID" of which is "4", "5", and "6", among the data included in the encrypted data 231a described with reference to FIG. 24 are included in the same data group.

In the following explanation, a plurality of pieces of specific information are added to the numerical data set in the "content" in the encrypted data 231a described with reference to FIG. 24. FIG. 25 is a diagram describing a case in which a plurality of pieces of specific information are added to the numerical value data set in the "content" in the encrypted data 231a described with reference to FIG. 24. Note that, in the following explanation, it is assumed that the position information 333 indicates positions of heads of the data.

For example, as illustrated in FIG. 25, the data converting section 313 adds, for example, "2", "1", and "2", which are a plurality of pieces of specific information divided from "5", which is a specific value, respectively to heads of data set in the "content" of the data, the "data ID" of which is "1", "2", and "3". For example, as illustrated in FIG. 25, the data converting section 313 adds, for example, "2", "3", and "0", which are a plurality of pieces of specific information divided from "5", which is the specific value, respectively to heads of data set in the "content" of the data, the "data ID" of which is "4", "5", and "6". Note that a way of dividing the specific value may be determined randomly, or may conform to a fixed rule, and the rule may be changed according to a predetermined condition or periodically. Bit positions in which the divided specific information is added (inserted) are not limited to the heads of the data and may be ends of the data or any bit positions. The position information 333 indicating the positions may be changed according to a predetermined condition or periodically.

That is, the data converting section 313 generates the encrypted data 231a from the measurement data 231 using only the data group information 331, the number of data information 332, and the position information 333 shared in advance with the information analysis device 1 in the information sharing processing. Consequently, as described below, the information analysis device 1 is capable of decrypting the encrypted data 231a by using only the information shared with the sensor devices 3 in advance.

Referring back to FIG. 16, the information transmitting section 314 of the sensor device 3 transmits the respective encrypted data 231a added with the plurality of pieces of specific information in the processing in S15 to the information collection device 2 (S16).

If the encryption and the transmission to the information collection device 2 are not performed for all of the measurement data 231 measured in the processing in S11 (YES in S17), the information acquiring section 312 performs the processing in S13 and subsequent steps again. On the other hand, if the encryption and the transmission to the information collection device 2 are performed concerning all of the measurement data 231 measured in the processing in S11 (NO in S17), the information acquiring section 312 stays on standby until the next data transmission timing (S11).

Figure 17:
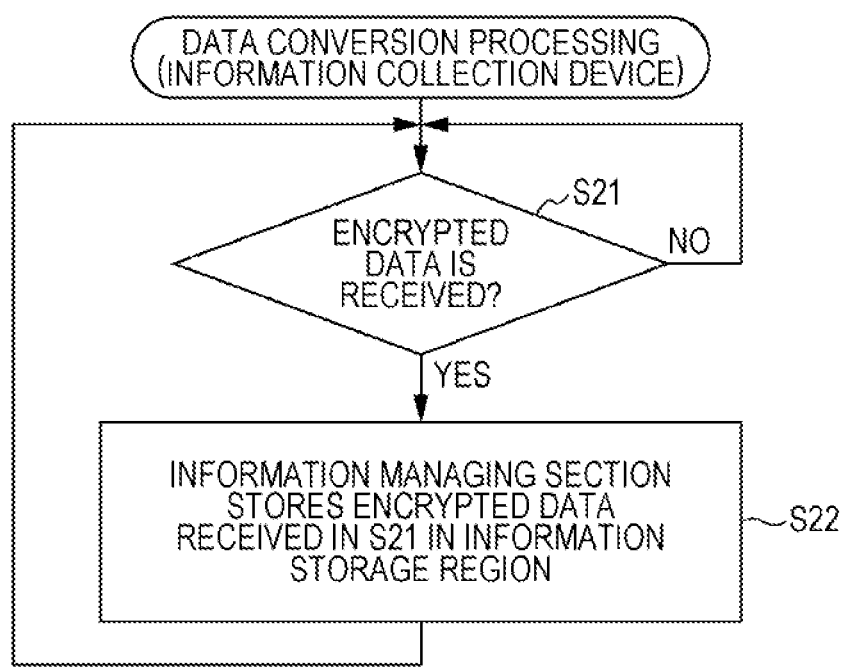
FIG. 17 is a flowchart describing the data conversion processing in the embodiment.
Figure 20:
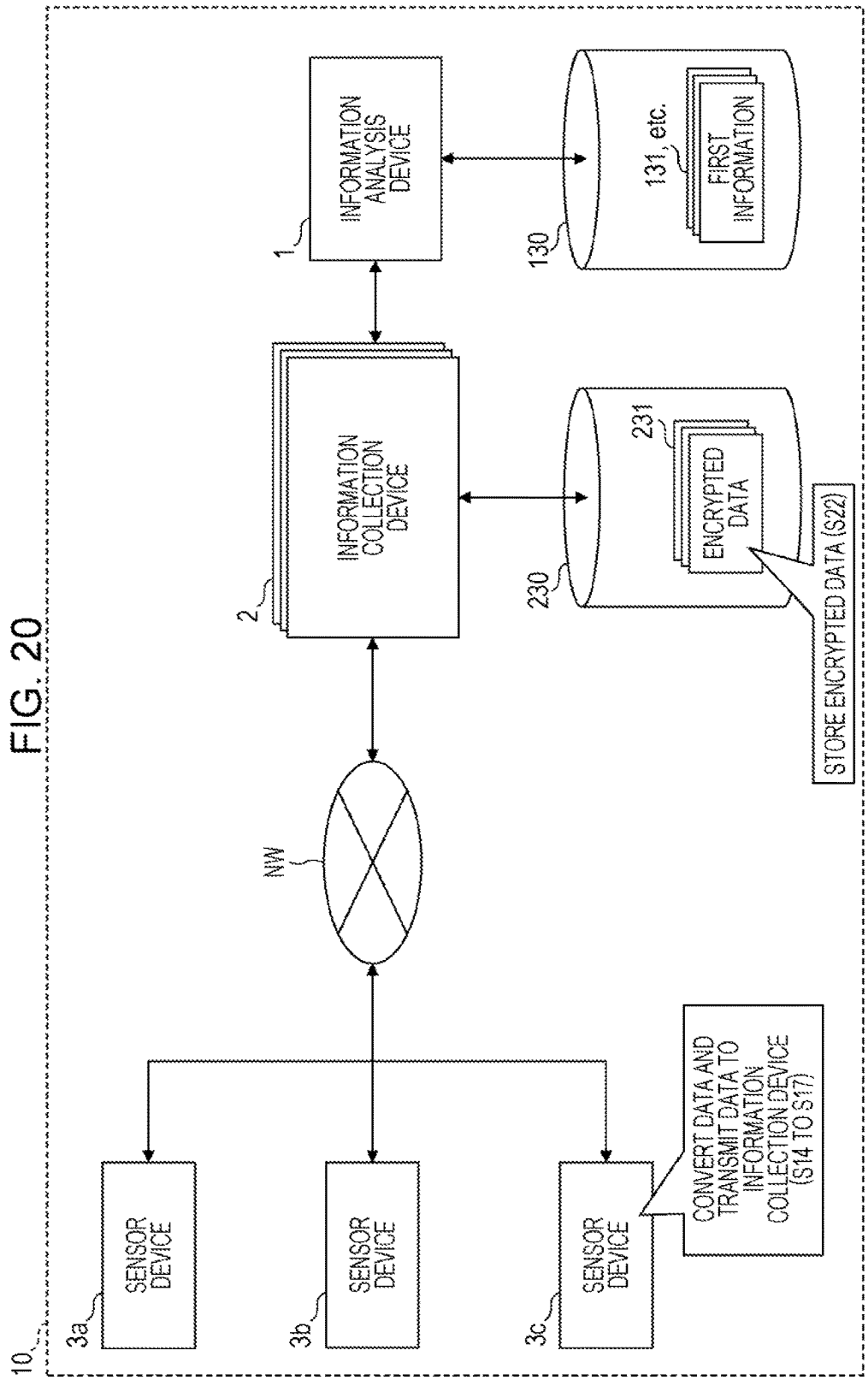
FIG. 20 is a diagram describing the data conversion processing in the embodiment.

The data conversion processing in the information collection device 2 is described. As illustrated in FIG. 17, the information receiving section 211 of the information collection device 2 stays on standby until the information receiving section 211 receives the encrypted data 231a from the sensor devices 3 (NO in S21). If the information receiving section 211 receives the encrypted data 231a from the sensor devices 3 (YES in S21), as illustrated in FIG. 20, the information managing section 212 of the information collection device 2 stores the encrypted data 231a received in the processing in S21 in the information storage region 230 (S22).

That is, the information managing section 212 stores the encrypted data 231a transmitted by the sensor device 3 in the information storage region 230 without decrypting the encrypted data 231a. Consequently, even when the provider or the like that manages the information analysis device 1 and the provider that manages the information collection device 2 are different, the provider or the like that manages the information analysis device 1 is capable of hiding, from the provider that manages the information collection device 2, a method of decrypting encrypted data transmitted by the sensor device 3.

Figure 18:
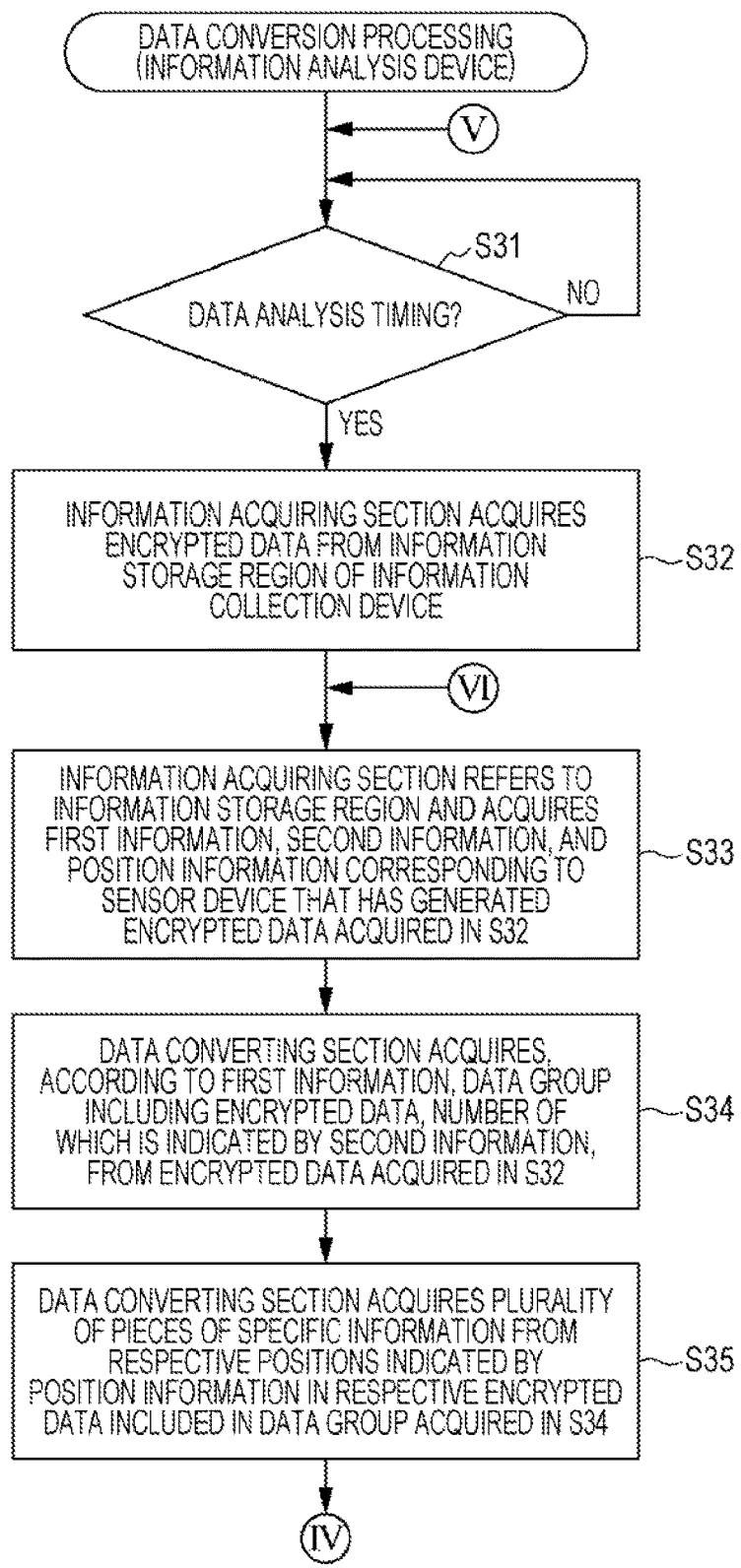
FIG. 18 is a flowchart describing the data conversion processing in the embodiment.

The data conversion processing in the information analysis device 1 is described. As illustrated in FIG. 18, the information receiving section 112 of the information analysis device 1 stays on standby until data analysis timing (NO in S31). The data analysis timing may be, for example, timing when the provider inputs, to the information analysis device 1, indication that the provider starts an analysis of the measurement data 231.

Figure 21:
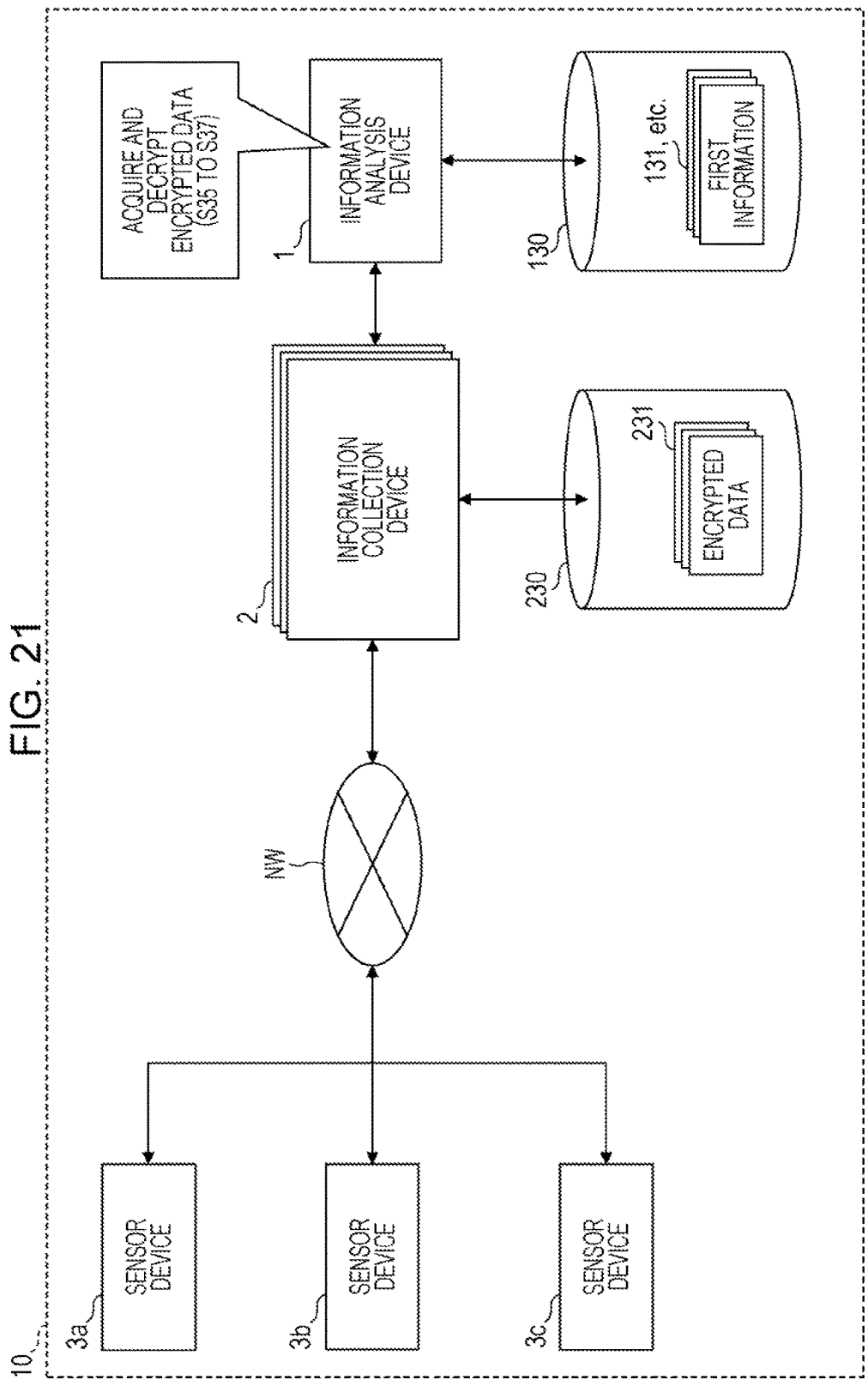
FIG. 21 is a diagram describing the data conversion processing in the embodiment.

If the data analysis timing comes (YES in S31), as illustrated in FIG. 21, the information receiving section 112 acquires the encrypted data 231a from the information storage region 230 of the information collection device 2 (S32). Note that the information receiving section 112 may acquire only data that has to be analyzed among the encrypted data 231a stored in the information storage region 230.

Thereafter, the information acquiring section 113 refers to the information storage region 130 and acquires the data group information 331, the number of data information 332, and the position information 333 corresponding to the sensor device 3 that generates the encrypted data 231a acquired in the processing in S32 (S33). That is, information such as the data group information 331 that the information analysis device 1 shares with the sensor devices 3 is sometimes different for each of the sensor devices 3. Therefore, the information acquiring section 113 refers to, for example, information set in the "sensor ID" of the encrypted data 231a acquired in the processing in S32 and acquires information concerning the sensor device 3 that generates the encrypted data 231a.

Subsequently, the data converting section 114 acquires, according to the data group information 331 acquired in the processing in S33, from the encrypted data 231a acquired in the processing in S32, a data group including the encrypted data 231a corresponding to the number of data indicated by the number of data information 332 acquired in the processing in S33 (S34).

Specifically, the data converting section 114 determines that, among the data included in the encrypted data 231a described with reference to FIG. 25, data set in the "time stamp" at the earliest time (data, the "data ID" of which is "1", "2", and "3") are data included in the same data group. The data converting section 114 determines that, among the data included in the encrypted data 231a described in FIG. 25, three data set in the "time stamp" at the second earliest time (data, the "data ID" of which is "4", "5", and "6") are data included in the same data group. Therefore, the data converting section 114 acquires, from the data included in the encrypted data 231a described with reference to FIG. 25, the data group including the data, the "data ID" of which is "1", "2", and "3", and the data group including the data, the "data ID" of which is "4" "5", and "6".

The sensor devices 3 and the information analysis device 1 may share in advance, among the encrypted data 231a generated by the sensor devices 3, information indicating data serving as a start point in decrypting the encrypted data 231a (hereinafter referred to as start point information as well). The start point information may be, for example, time set in the "time stamp" of the data serving as the start point. In the processing in S34, the data converting section 114 may acquire a data group starting from the data indicated by the start point information.

Specifically, when time indicated by the start point information is "2016/07/25 14:01:00", the data converting section 114 determines that, among the encrypted data 231a described with reference to FIG. 25, information, the "data ID" of which is "3", is the start point. In this case, the data converting section 114 determines that data, the "data ID" of which is "3", "4", and "5", are data included in the same data group.

Thereafter, the data converting section 114 acquires a plurality of pieces of specific information from respective positions indicated by the position information 333 in the respective encrypted data 231a included in the data group acquired in the processing in S34 (S35).

Specifically, the data converting section 114 acquires, as the plurality of pieces of specific information, for example, "2", "1", and "2", which are values of heads of data set in the "content" of the data, the "data ID" of which is "1", "2", and "3", in the encrypted data 231a described with reference to FIG. 25. The data converting section 114 acquires, as the plurality of pieces of specific information, for example, "2", "3", and "0", which are values of heads of data set in the "content" of data, the "data ID" of which is "4", "5", and "6", in the encrypted data 231a described with reference to FIG. 25.

Figure 19:
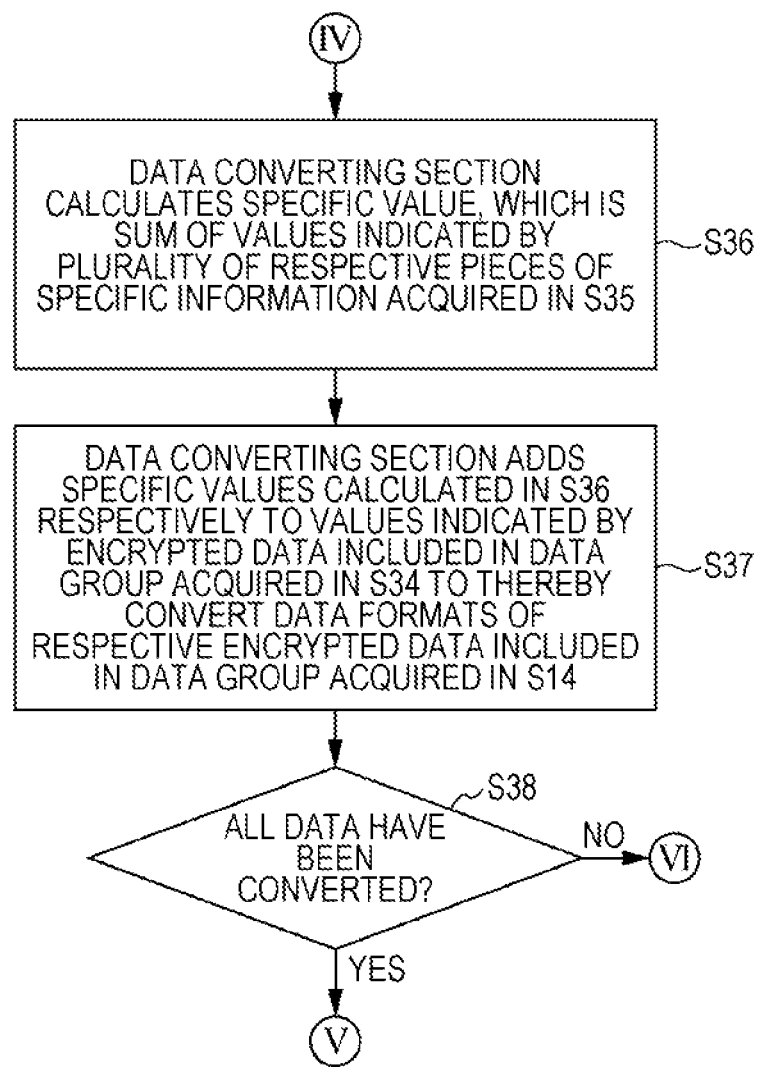
FIG. 19 is a flowchart describing the data conversion processing in the embodiment.

Further, as illustrated in FIG. 19, the data converting section 114 calculates a specific value, which is a sum of values indicated respectively by the plurality of pieces of specific information acquired in the processing in S35 (S36). The data converting section 114 adds the specific value calculated in the processing in S36 respectively to the values indicated by the encrypted data 231a included in the data group acquired in the processing in S34 to thereby convert the respective data formats of the encrypted data 231a included in the data group acquired in the processing in S14 and generate the measurement data 231 (S37).

Specifically, the data converting section 114 calculates "5", which is a sum of "2", "1", and "2", which are a plurality of pieces of specific information corresponding to the data, the "data ID" of which are "1", "2", and "3", in the encrypted data 231a described with reference to FIG. 25. The data converting section 114 deletes values added to heads of data set in the "content" in the data, the "data ID" of which is "1", "2", and "3". That is, the data converting section 114 generates data same as the data, the "data ID" of which is "1", "2", and "3", in the encrypted data 231a described with reference to FIG. 24. Thereafter, the data converting section 114 adds "5" to the values indicated by the data set in the "content" in the data, the "data ID" of which is "1", "2", and "3". That is, the data converting section 114 generates data same as the data, the "data ID" of which is "1", "2", and "3", in the measurement data 231 described with reference to FIG. 23.

Similarly, the data converting section 114 calculates "5", which is a sum of "2", "3", and "0", which are a plurality of pieces of specific information corresponding to the data, the "data ID" of which are "4", "5", and "6", in the encrypted data 231a described with reference to FIG. 25. The data converting section 114 deletes values added to heads of data set in the "content" in the data, the "data ID" of which is "4", "5", and "6". That is, the data converting section 114 generates data same as the data, the "data ID" of which is "4", "5", and "6", in the encrypted data 231a described with reference to FIG. 24. Thereafter, the data converting section 114 adds "5" to the values indicated by the data set in the "content" in the data, the "data ID" of which is "4", "5", and "6". That is, the data converting section 114 generates data same as the data, the "data ID" of which is "4", "5", and "6", in the measurement data 231 described with reference to FIG. 23.

Thereafter, the data converting section 114 converts numerical value data set in the "content" of the data into character data. That is, the data converting section 114 generates data same as the measurement data 231 described with reference to FIG. 22.

Referring back to FIG. 19, if not all of the encrypted data 231a acquired from the information storage region 230 of the information collection device 2 have been decrypted (NO in S38), the information acquiring section 113 performs the processing in S33 and subsequent steps again. On the other hand, if all of the encrypted data 231a acquired from the information storage region 230 of the information collection device 2 are decrypted (YES in S38), the information acquiring section 113 stays on standby until the next data analysis timing (S31).

In this way, the information analysis device 1 according to this embodiment shares in advance, with the sensor devices 3, for example, the data group information 331 designating any data among the plurality of measurement data 231. When the plurality of encrypted data 231a are transmitted from the sensor devices 3, the information collection device 2 directly stores the transmitted plurality of encrypted data 231a in the information storage region 230 without decrypting the encrypted data 231a.

When the information analysis device 1 acquires the plurality of encrypted data 231a from the information storage region 230, the information analysis device 1 acquires, based on the data group information 331 and the like, a plurality of conversion target data, data formats of which have to be simultaneously converted. Thereafter, the information analysis device 1 acquires a plurality of pieces of specific information included respectively in the acquired plurality of conversion target data and converts respective data formats of the plurality of conversion target data using the acquired plurality of pieces of specific information.

Consequently, the sensor devices 3 do not have to transmit keys upon transmission of encrypted data to the information collection device 2. Therefore, the information processing system 10 is capable of suppressing communication cost involved in the decryption of the encrypted data 231a transmitted by the sensor device 3.

The information collection device 2 stores the encrypted data 231a transmitted by the sensor device 3 in the storage 230 without decrypting the encrypted data 231a. The information analysis device 1 accesses the storage 230 and acquires data (the encrypted data 231a) in the encrypted state. Consequently, even when the provider or the like that manages the information analysis device 1 and the provider that manages the information collection device 2 are different, the provider or the like that manages the information analysis device 1 is capable of hiding, from the provider that manages the information collection device 2, a method of decrypting encrypted data transmitted by the sensor device 3.

That is, for example, when the sensor devices 3 measure various data in the data center, the measurement data 231 is sometimes data that has a value only when an enormous amount of data (for example, all data measured in one moth) is analyzed. In the case of such measurement data 231, if the sensor devices 3 generate the encrypted data 231a for each one of the measurement data 231 and then transmit the encrypted data 231a to the information collection device 2 and the like, this is sometimes determined as disadvantageous in terms of communication cost with respect to the value of the measurement data 231.

Therefore, the sensor devices 3 in this embodiment encrypt each of data groups of the measurement data 231. Consequently, the information processing system 10 is capable of suppressing communication cost for the encryption of the measurement data 231 compared with when the sensor devices 3 generate the encrypted data 231a for each one of the measurement data 231.

Further, when the number of the measurement data 231 included in the data groups (the number indicated by the number of data information 332) is sufficiently small with respect to a number that gives the value to the measurement data 231, even if encryption performed on one data group is decoded by a malicious person, the value of the measurement data 231 is not spoiled. Therefore, the sensor device 3 in this embodiment is capable of suppressing communication cost for the encryption of the measurement data 231 without causing possibility that the value of the measurement data 231 is spoiled.

The sensor devices 3 in this embodiment transmit the data group information 331 and the like to the information analysis device 1 in advance. Therefore, the provider that manages the sensor devices 3 is capable of selecting a scheme of encryption (intensity of encryption) for the measurement data 231 after taking into account importance of the measurement data 231, communication cost, and the like.

Note that, in the above explanation in this embodiment, the specific value is subtracted from the data on the transmission side and the specific value is added to the data on the reception side. However, conversely, the specific value may be added on the transmission side and subtracted on the reception side. Alternatively, instead of the addition and the subtraction, other arithmetical operations such as multiplication and division and logical operations such as EOR (Exclusive OR) may also be used.

Confidentiality is further improved if the first information, the second information, and the position information are changed periodically or according to a predetermined condition.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A computer-readable non-transitory storage medium storing a data conversion program that causes a computer to execute a process comprising:
    when receiving a plurality of data from sensors for information measured by the sensors, acquiring first information and second information from a storage, the first information designating any of the data among the plurality of data, the second information designating a predetermined number of the data among the plurality of data that is encrypted using a key value;
    acquiring, as conversion target data, the predetermined number of the data from among the received plurality of data as designated by the second information and relating to the data among the received plurality of data as designated by the first information;
    extracting, from the conversion target data, a predetermined number of pieces of specific information relating to the key value, each of the predetermined number of pieces of specific information relating to the key value being embedded in each of the predetermined number of the data from among the received plurality of data;
    generating the key value from the extracted predetermined number of pieces of the specific information relating to the key value; and
    converting a data format of the conversion target data into decrypted data by using the key value generated from the extracted predetermined number of pieces of the specific information relating to the key value.

2. The computer-readable storage medium storing the data conversion program according to claim 1, the process further comprising:
    receiving the first information and the second information in advance, from an information processing device that transmits the plurality of data, before the acquiring the first information and the second information; and
    storing the received first information and the received second information in the storage.

3. The computer-readable storage medium storing the data conversion program according to claim 2, wherein
    the first information is information designating the data among the plurality of data being in descending order of time.

4. The computer-readable storage medium storing the data conversion program according to claim 3, wherein
    the time corresponding to the respective data among the plurality of data include times when the information processing device has acquired the respective data.

5. The computer-readable storage medium storing the data conversion program according to claim 2, the process further comprising:
    receiving, before the acquiring of the first information and the second information, from the information processing device that transmits the plurality of data, position information designating positions where each of the predetermined number of pieces of the specific information relating to the key value is embedded in each of the predetermined number of the data among the received plurality of data; and
    storing the received position information in the storage, and wherein
    in the extracting of the predetermined number of pieces of the specific information relating to the key value, the position information is acquired from the storage, and each of the predetermined number of pieces of the specific information relating to the key value is extracted from the position indicated by the position information in each of the predetermined number of the data from among the received plurality of data.

6. The computer-readable storage medium storing the data conversion program according to claim 1, wherein
in the converting of the data format, the key value is a sum of respective values indicated by the extracted predetermined number of pieces of the specific information relating to the key value, and the data format of the conversion target data is converted by performing a predetermined operation between each of the predetermined number of the data from among the received plurality of data and the key value.

7. The computer-readable storage medium storing the data conversion program according to claim 6, wherein
the predetermined operation is addition or subtraction.

8. The computer-readable storage medium storing the data conversion program according to claim 1, wherein
in the acquiring of the first information and the second information, an information processing device that has transmitted the plurality of data is specified, and the first information and the second information corresponding to the specified information processing device are acquired.

9. The computer-readable storage medium storing the data conversion program according to claim 1, wherein
the acquiring of the conversion target data, the extracting of the predetermined number of pieces of the specific information relating to the key value, and the converting are repeatedly performed until the data formats are converted for all of the received plurality of data.

10. A computer-readable non-transitory storage medium storing a data conversion program that causes a computer to execute a process comprising:
acquiring first information and second information from a storage, the first information designating any of data among a plurality of data from sensors for information measured by the sensors, the second information designating a predetermined number of the data among the plurality of data that is encrypted using a key value;
acquiring, as conversion target data, the predetermined number of the data from among the plurality of data as designated by the second information and relating to the data among the plurality of data as designated by the first information;
converting a data format of the conversion target data into encrypted data by using the key value;
embedding a predetermined number of pieces of specific information relating to the key value, a sum of which is the key value, respectively in each of the predetermined number of the data from among the plurality of data after being converted; and
transmitting the conversion target data, converted and embedded with each of the predetermined number of pieces of specific information relating to the key value to an information processing device.

11. The computer-readable storage medium storing the data conversion program according to claim 10, the process further comprising
transmitting the first information and the second information to the information processing device before the transmitting of the conversion target data.

12. The computer-readable storage medium storing the data conversion program according to claim 10, the process further comprising
before the embedding, acquiring, from the storage, position information designating positions at where the predetermined number of pieces of specific information relating to the key value are embedded respectively in the conversion target data, wherein
in the embedding, the pieces of specific information relating to the key value are embedded at the respective positions indicated by the position information in the conversion target data.

13. The computer-readable storage medium storing the data conversion program according to claim 12, the process further comprising
transmitting the position information to the information processing device before the transmitting of the conversion target data.

14. The computer-readable storage medium storing the data conversion program according to claim 10, wherein
in the converting, the respective data formats of the acquired conversion target data are converted by subtracting or adding the pieces of specific information relating to the key value respectively from or to values indicated by the acquired conversion target data.

15. The computer-readable storage medium storing the data conversion program according to claim 10, wherein
the acquiring of the conversion target data, the converting, the adding, and the transmitting are repeatedly performed until all of the plurality of data are transmitted.

16. A data conversion device comprising:
a memory, and
a processor coupled to the memory and configured to execute a process comprising;
acquiring, when receiving a plurality of data from sensors for information measured by the sensors, first information and second information from a storage, the first information designating any of the data among the plurality of data, the second information designating a predetermined number of the data among the plurality of data that is encrypted using a key value;
acquiring, as conversion target data, the predetermined number of the data from among the received plurality of data as designated by the second information and relating to the data among the received plurality of data as designated by the first information;
extracting, from the conversion target data, a predetermined number of pieces of specific information relating to the key value, each of the predetermined number of pieces of specific information relating to the key value being embedded in each of the predetermined number of the data from among the received plurality of data;
generating the key value from the extracted predetermined number of pieces of the specific information relating to the key value; and
converting a data format of the conversion target data into decrypted data by using the key value generated from the extracted predetermined number of pieces of the specific information relating to the key value.

17. A data conversion method performed by a computer, the method is configured to cause the computer to:
when the computer receives a plurality of data from sensors for information measured by the sensors, acquire first information and second information from a storage, the first information designating any of the data among the plurality of data, the second information designating a predetermined number of the data among the plurality of data that is encrypted using a key value;

acquire, as conversion target data, the predetermined number of the data from among the received plurality of data as designated by the second information and relating to the data among the received plurality of data as designated by the first information;

extract, from the conversion target data, a predetermined number of pieces of specific information relating to the key value, each of the predetermined number of pieces of specific information relating to the key value being embedded in each of the predetermined number of the data from among the received plurality of data;

generate the key value from the extracted predetermined number of pieces of the specific information relating to the key value; and convert a data format of the conversion target data into decrypted data by using the key value generated from the extracted predetermined number of pieces of the specific information relating to the key value.

* * * * *